United States Patent
Nagasaka et al.

(10) Patent No.: US 10,349,308 B2
(45) Date of Patent: *Jul. 9, 2019

(54) COMMUNICATION CONTROL METHOD, USER TERMINAL, AND PROCESSOR

(71) Applicant: KYOCERA CORPORATION, Kyoto (JP)

(72) Inventors: Yushi Nagasaka, Yokohama (JP); Masato Fujishiro, Yokohama (JP); Hiroyuki Adachi, Kawasaki (JP); Kugo Morita, Yokohama (JP); Chiharu Yamazaki, Ota-ku (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 214 days.

This patent is subject to a terminal disclaimer.

(21) Appl. No.: 14/890,094

(22) PCT Filed: May 8, 2014

(86) PCT No.: PCT/JP2014/062369
§ 371 (c)(1),
(2) Date: Nov. 9, 2015

(87) PCT Pub. No.: WO2014/181830
PCT Pub. Date: Nov. 13, 2014

(65) Prior Publication Data
US 2016/0112921 A1  Apr. 21, 2016

Related U.S. Application Data

(60) Provisional application No. 61/864,250, filed on Aug. 9, 2013.

(30) Foreign Application Priority Data

May 10, 2013 (JP) .................. 2013-100600
May 10, 2013 (JP) .................. 2013-100777

(Continued)

(51) Int. Cl.
*H04W 80/04* (2009.01)
*H04W 28/08* (2009.01)
(Continued)

(52) U.S. Cl.
CPC .......... *H04W 28/08* (2013.01); *H04W 36/02* (2013.01); *H04W 36/22* (2013.01); *H04W 48/08* (2013.01);
(Continued)

(58) Field of Classification Search
CPC ..... H04W 36/24; H04W 36/00; H04W 36/14; H04W 36/0022; H04W 36/30;
(Continued)

(56) References Cited

U.S. PATENT DOCUMENTS

2004/0165563 A1  8/2004 Hsu et al.
2009/0219902 A1  9/2009 Aoyama
(Continued)

FOREIGN PATENT DOCUMENTS

JP  2005-109899 A  4/2005
JP  2006-518972 A  8/2006
(Continued)

OTHER PUBLICATIONS

The extended European search report issued by the European Patent Office on Sep. 20, 2016, which corresponds to European Patent Application No. 14795017.4-1854 and is related to U.S. Appl. No. 14/890,094.
(Continued)

*Primary Examiner* — Salvador E Rivas
*Assistant Examiner* — Rasha K Fayed
(74) *Attorney, Agent, or Firm* — Studebaker & Brackett PC

(57) ABSTRACT

A communication control method is a method for performing offload to transfer a traffic load of a cellular base station
(Continued)

to an access point. The communication control method comprises a step of maintaining without releasing the first connection, by a user terminal that have established a first connection with the cellular base station, even when the offload is started after establishing a second connection with the access point; and a determining step of determining, by the user terminal, whether the offload is continued or canceled after the offload is started.

7 Claims, 24 Drawing Sheets

(30) Foreign Application Priority Data

May 10, 2013 (JP) .................................. 2013-100779
May 10, 2013 (JP) .................................. 2013-100780

(51) Int. Cl.
*H04W 36/22* (2009.01)
*H04W 36/02* (2009.01)
*H04W 48/18* (2009.01)
*H04W 48/08* (2009.01)
*H04W 84/12* (2009.01)
*H04W 88/06* (2009.01)

(52) U.S. Cl.
CPC ............ *H04W 48/18* (2013.01); *H04W 84/12* (2013.01); *H04W 88/06* (2013.01)

(58) Field of Classification Search
CPC . H04W 36/0055; H04W 36/28; H04W 36/22; H04W 36/0038; H04W 76/00; H04W 24/02; H04W 28/08; H04W 92/02; H04W 52/0258; H04W 52/0209; H04W 52/04; H04W 52/0261; H04W 52/0235; H04W 52/0212; H04W 52/0274; H04W 72/0486; H04W 72/005; H04W 72/044; H04W 72/042; H04W 72/0406; H04W 72/02; H04W 48/20; H04W 48/16; H04W 48/10; H04W 88/08; H04W 88/06; H04W 84/12; H04W 84/02; H04L 12/28; H04L 65/4084; H04L 65/608; H04L 65/60; H04L 65/602

USPC .......................................... 370/331, 235, 338
See application file for complete search history.

(56) References Cited

U.S. PATENT DOCUMENTS

| | | | | |
|---|---|---|---|---|
| 2011/0222523 | A1* | 9/2011 | Fu | H04W 36/22 370/338 |
| 2012/0196644 | A1* | 8/2012 | Scherzer | H04W 48/18 455/524 |
| 2012/0314569 | A1* | 12/2012 | Liu | H04W 36/0094 370/230 |
| 2014/0031054 | A1 | 1/2014 | Zou et al. | |
| 2014/0064068 | A1* | 3/2014 | Horn | H04W 28/0289 370/230 |
| 2014/0079022 | A1* | 3/2014 | Wang | H04W 36/22 370/331 |
| 2014/0204771 | A1* | 7/2014 | Gao | H04W 36/28 370/252 |
| 2014/0204909 | A1 | 7/2014 | Cheng et al. | |
| 2014/0206353 | A1* | 7/2014 | Kim | H04W 36/14 455/436 |
| 2015/0341962 | A1 | 11/2015 | Zou et al. | |
| 2016/0029295 | A1* | 1/2016 | Nagasaka | H04W 48/18 370/237 |
| 2017/0026868 | A1* | 1/2017 | Gupta | H04W 4/70 |

FOREIGN PATENT DOCUMENTS

| | | |
|---|---|---|
| JP | 2009-044309 A | 2/2009 |
| WO | 2007100085 A1 | 9/2007 |
| WO | 2011110108 A1 | 9/2011 |
| WO | 2012/139278 A1 | 10/2012 |
| WO | 2013/042330 A1 | 3/2013 |

OTHER PUBLICATIONS

New Study Item Proposal on WLAN/3GPP Radio Interworking; 3GPP TSG-RAN Meeting #57; RP-1201455; Sep. 13-15, 2012.
International Search Report and Written Opinion from PCT/JP2014/062369 dated Aug. 5, 2014.

* cited by examiner

COMMUNICATION CONTROL METHOD, USER TERMINAL, AND PROCESSOR

TECHNICAL FIELD

The present invention relates to a communication control method, a user terminal, and a processor, used in cellular communication system allowed to cooperate with a wireless LAN system (a WLAN system).

BACKGROUND ART

In recent years, a user terminal (so-called dual terminal) comprising a cellular communication unit and a wireless LAN communication unit is becoming widely used. Further, the number of wireless LAN access points (hereinafter called "access points") managed by an operator of a cellular communication system increases.

Therefore, in 3GPP (3rd Generation Partnership Project) which is a project aiming to standardize a cellular communication system, it is expected to consider a technology capable of enhancing cooperation between a cellular communication system and a wireless LAN system (see Non Patent Document 1).

One purpose of such technology is that balance of load level in a cellular base station and an access point is taken by improving usage rate of access point.

For example, it is possible to transfer (offload) traffic load of a cellular base station to an access point by switch such that traffic transmitted and received between the cellular base station and a user terminal is transmitted and received between the access point and the user terminal.

PRIOR ART DOCUMENT

Non-Patent Document

Non-Patent Document 1: 3GPP contribution "RP-1201455"

SUMMARY OF THE INVENTION

By the way, the user terminal generally releases a connection with a cellular base station in a case where a user terminal establishes a connection with an access point. Thus, the user terminal becomes an idle state of the cellular communication during performing the above offload.

However, an inefficient operation (so-called ping-pong phenomenon) that the connection between the user terminal and the cellular base station is anew established may occur in such cases where communication status between the user terminal and the access point deteriorates after establishing the connection between the user terminal and the access point.

Therefore, an object of the present invention is to effectively control the offload to transfer the traffic load of a cellular base station to an access point.

A communication control method according to an embodiment is a method for performing offload to transfer a traffic load of a cellular base station to an access point. The communication control method comprises a step of maintaining without releasing the first connection, by a user terminal that have established a first connection with the cellular base station, even when the offload is started after establishing a second connection with the access point; and a determining step of determining, by the user terminal, whether the offload is continued or canceled after the offload is started.

A user terminal according to an embodiment comprises: a controller configured to establish a second connection with an access point which is included in a wireless local area network (WLAN) and start offload to transfer a traffic of a mobile communication network to the WLAN, when the user terminal has established the first connection with a base station which is included in the mobile communication network. The controller maintains the first connection even after the offload is started. The controller determines whether to continue the offload or not.

A processor according to a processor for controlling a user terminal. The processor comprises: a step of establishing a second connection with an access point which is included in a wireless local area network (WLAN) and starting offload to transfer a traffic of a mobile communication network to the WLAN, when the user terminal has established the first connection with a base station which is included in the mobile communication network; a step of maintaining the first connection even after the offload is started, and a step of determining whether to continue the offload or not.

DESCRIPTION OF THE EMBODIMENT

Overview of Embodiment

Figure 1:
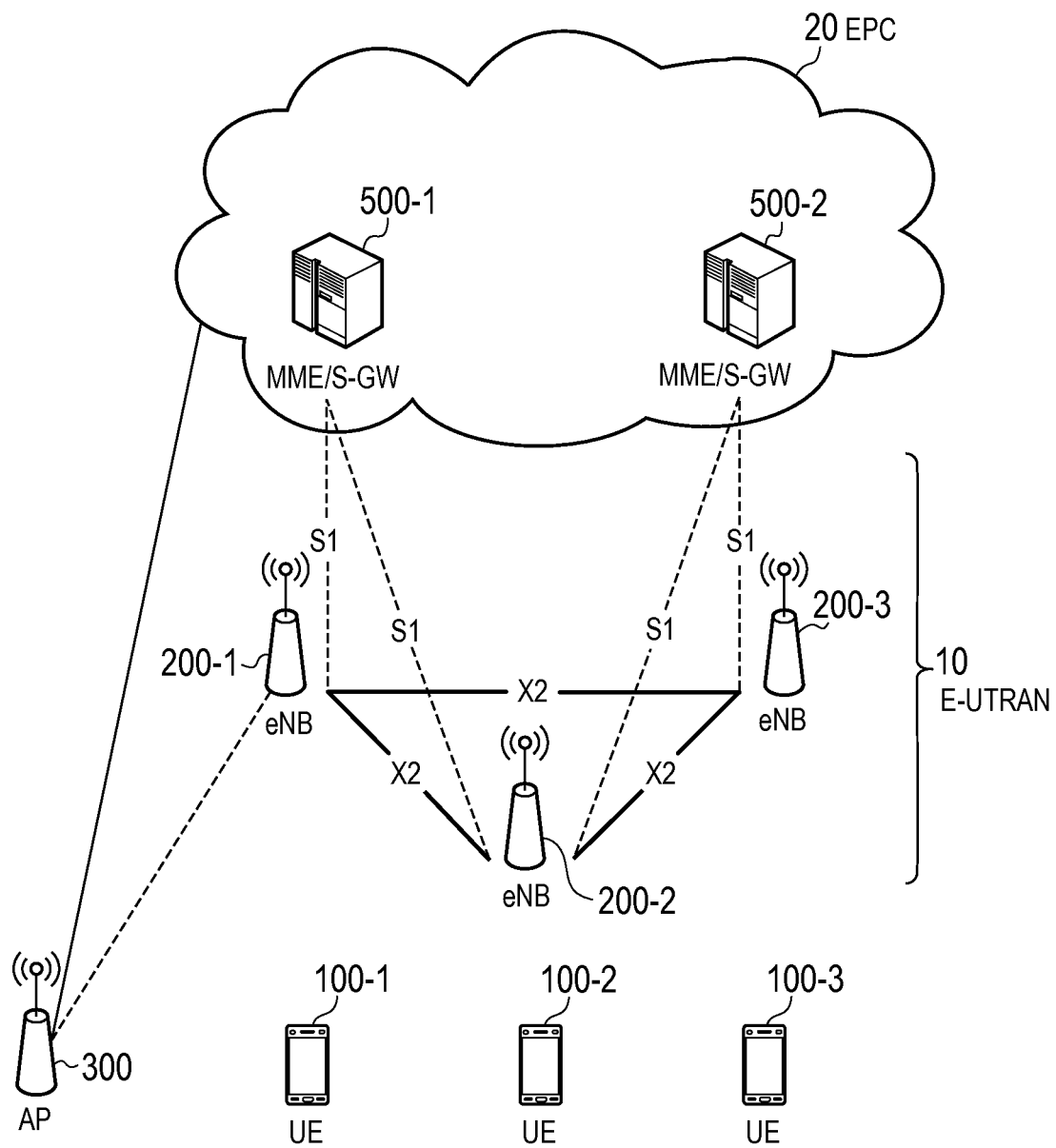
FIG. 1 is a system configuration diagram according to a first embodiment and a second embodiment.

A communication control method according to the first embodiment and the second embodiment is a method for performing offload to transfer a traffic load of a cellular base station to an access point. The communication control method comprises a step of maintaining without releasing the first connection, by a user terminal that have established a first connection with the cellular base station, even when the offload is started after establishing a second connection with the access point; and a determining step of determining, by the user terminal, whether the offload is continued or canceled after the offload is started.

In the first embodiment and the second embodiment, in the determining step, the user terminal carries out the determination on the basis of a communication status with the access point.

In the operation pattern 1 according to the first embodiment, the communication control method further comprises: a step of receiving from the cellular base station, before the first connection is released, by the user terminal, configuration information for configuration of an operation of the user terminal after the first connection is released.

In the operation pattern 1 according to the first embodiment, the communication control method further comprises: a step of transmitting, by the user terminal, a notification indicating that the offload is continued, to the cellular base station, when it is determined in the determining step that the offload is continued; and a step of releasing, by the user terminal, the first connection after the notification is transmitted.

In the operation pattern 1 according to the first embodiment, the communication control method further comprises: a step of canceling the offload and discarding the configuration information, by the user terminal, when it is determined in the determining step that the offload is canceled.

In the operation pattern 2 according to the first embodiment, the communication control method further comprises a step of transmitting, to the cellular base station, by the user terminal, a transmission stop request for requesting to stop transmitting a release instruction of the first connection, before the offload is started.

In the operation pattern 2 according to the first embodiment, the communication control method further comprises: a step of transmitting, to the cellular base station, by the user terminal, a transmission request to request to transmit the release instruction when it is determined in the determining step that the offload is continued; and a step of receiving, by the user terminal, the release instruction from the cellular base station. The release instruction includes configuration information for configuration of an operation of the user terminal, after the first connection is released.

In the first embodiment and the second embodiment, the user terminal comprises a terminal-side timer that regulates a connection maintaining period during which the first connection should be maintained after the offload is started. The communication control method further comprises: a step of activating, by the user terminal, the terminal-side timer when the offload is started; and a maintaining step of maintaining, by the user terminal, the first connection until the terminal-side timer expires.

In the operation pattern 1 according to the second embodiment, the cellular base station comprises a base station-side timer that regulates a connection maintaining period during which the first connection should be maintained after transmission and reception of traffic with the user terminal is stopped. The connection maintaining period set to the terminal-side timer is equal to or shorter than the connection maintaining period set to the base station-side timer.

In the operation pattern 2 according to the second embodiment, the cellular base station comprises a base station-side timer that regulates a connection maintaining period during which the first connection should be maintained after transmission and reception of traffic with the user terminal is stopped. In the maintaining step, the user terminal transmits and receives the traffic with the access point and transmits and receives the traffic with the cellular base station for stopping the base station-side timer.

In the operation pattern 3 according to the second embodiment, the cellular base station comprises a base station-side timer that regulates a connection maintaining period during which the first connection should be maintained after transmission and reception of traffic with the user terminal is stopped. The communication control method further comprises a step of inquiring the user terminal from the cellular base station of whether it is possible to release the first connection in a case where the release request for the first connection is not received from the user terminal when the base station-side timer expires in the cellular base station.

In the operation pattern 4 according to the second embodiment, the cellular base station comprises a base station-side timer that regulates a connection maintaining period during which the first connection should be maintained after transmission and reception of traffic with the user terminal is stopped. The communication control method further comprises a control step of controlling, by the cellular base station, the base station-side timer in order to prevent the base station-side timer from expiring before the terminal-side timer expires.

In the operation pattern 4-1 according to the second embodiment, the base station-side timer includes a first base station-side timer used for a purpose of other than the offload and a second base station-side timer used for a purpose of the offload. The connection maintaining period set to the second base station-side timer is longer than the connection maintaining period set to the first base station-side timer. In the control step, the cellular base station selects the second base station-side timer and then activates the second base station-side timer, in response to a start of the offload.

In the operation pattern 4-2 according to the second embodiment, the communication control method further comprises a step of notifying, by the cellular base station, the user terminal of the connection maintaining period that should be set to the terminal-side timer. In the control step, the cellular base station sets the connection maintaining period equal to or longer than the connection maintaining period notified to the user terminal, to the base station-side timer.

In the operation pattern 4-3 according to the second embodiment, in the control step, the cellular base station cancels the activation of the base station-side timer in response to the start of the offload.

A user terminal according to the third embodiment comprises a cellular communication unit and a WLAN communication unit. The user terminal comprises: a controller configured to measure a movement speed of the user terminal when the WLAN communication unit is in an on state. The controller restricts a start of connection by the WLAN communication unit with an access point when detecting a rapid decrease in the movement speed.

In the third embodiment, the controller cancels the restriction of the start of the connection when detecting a rapid increase in the movement speed after detecting the rapid decrease in the movement speed.

In the modification of the third embodiment, it further comprises: a storage configured to store a list of the access points that should be subject to the connection restriction. The controller restricts a start of connection with the access point included in the list.

In the third embodiment, the cellular communication unit receives the list from a cellular base station. The storage stores the list received from the cellular base station.

A user terminal according to the fourth embodiment comprises a cellular communication unit and a WLAN communication unit. The user terminal comprises: a controller configured to measure a reception level from an access point when the WLAN communication unit is in an on state. The controller restricts a start of connection by the WLAN communication unit with the access point when detecting a rapid increase in the reception level.

In the fourth embodiment, the controller cancels the restriction of the start of the connection when detecting a rapid decrease in the reception level after detecting the rapid increase in the reception level.

In the modification of the fourth embodiment, it further comprises: a storage configured to store a list of the access points that should be subject to the connection restriction. The controller restricts the start of connection with the access point included in the list.

In the modification of the fourth embodiment, the cellular communication unit receives the list from a cellular base station. The storage stores the list received from the cellular base station.

A user terminal according to the fifth embodiment comprises: a cellular communication unit configured to transmit and receive a cellular radio signal with a cellular base station; a WLAN communication unit configured to transmit and receive a WLAN radio signal with an access point; and a controller configured to switch the WLAN communication unit to an on state, when the WLAN communication unit is in an off state and when the cellular communication unit receives, from the cellular base station, a WLAN on request for switching the WLAN communication unit to the on state. The WLAN on request includes scan control information for controlling a WLAN scan that is an operation in which reception of the WLAN radio signal is attempted by the WLAN communication unit for each WLAN channel. The controller controls the WLAN scan in accordance with the scan control information included in the WLAN on request after switching the WLAN communication unit to the on state.

In the fifth embodiment, the controller notifies, before receiving the WLAN on request, the cellular base station of at least one of information indicating a WLAN communication capability of the user terminal and information indicating that the WLAN communication unit is in an off state.

In the fifth embodiment, the scan control information includes at least one of channel information for designating a WLAN channel subject to the WLAN scan or a WLAN channel not subject to the WLAN scan, and frequency band information for designating a WLAN frequency band subject to the WLAN scan or a WLAN frequency band not subject to the WLAN scan.

In the fifth embodiment, the scan control information includes priority information for designating a WLAN channel or a WLAN frequency band where reception of the WLAN radio signal should be preferentially attempted in the WLAN scan.

In the fifth embodiment, the scan control information includes at least one of period information for designating a period during which the WLAN scan should be continued, and timing information for designating a timing at which the WLAN scan should be performed.

In the fifth embodiment, the user terminal further comprises: a GNSS receiver configured to receive a GNSS (Global Navigation Satellite System) signal. The controller notifies the cellular base station of information on a reception level of the GNSS signal prior to reception of the WLAN on request.

In the fifth embodiment, the controller ignores the WLAN on request when the WLAN communication unit is in an on state and when the cellular communication unit receives, from the cellular base station, the WLAN on request.

A communication control method according to the sixth embodiment is a communication control method for allowing a cellular communication system to cooperate with a wireless LAN system, and comprises: a determination step of determining whether or not a connection between a wireless LAN access point directly connected to a small cell base station and a user terminal connected to the wireless LAN access point becomes difficult; a connection step of connecting, by the user terminal, to a cell managed by another base station, when it is determined that the connection between the user terminal and the wireless LAN access point becomes difficult; and a transfer step of transferring, by the wireless LAN access point, user data on the user terminal owned by the wireless LAN access point by way of the small cell base station to the another base station when it is determined that the connection between the user terminal and the wireless LAN access point becomes difficult.

The communication control method according to the sixth embodiment further comprises: a request step of making, by the user terminal, a request to transfer the user data to the another base station when it is determined in the determination step that the connection between the user terminal and the wireless LAN access point becomes difficult, wherein in the transfer step, the wireless LAN access point transfers, resulting from the request in the request step, the user data to the another base station by way of the small cell base station.

In the communication control method according to the sixth embodiment, in the determination step, the user terminal determines that the connection with the wireless LAN access point becomes difficult, even if a signal intensity received from the wireless LAN access point is equal to or more than a predetermined value that is a value by which it is possible to ensure communication quality, when the wireless LAN access point is of collocated type in which the wireless LAN access point is disposed at the same place as the small cell base station, and a signal intensity received from the small cell base station is less than a predetermined value.

The communication control method according to the sixth embodiment further comprises: a first transfer request step of requesting, when receiving the request in the request step, by the another base station, the small cell base station to transfer the user data to the another base station from the wireless LAN access point by way of the small cell base station; and a second transfer request step of requesting, when receiving the request in the first transfer request step, by the small cell base station, the wireless LAN access point to transfer the user data to the small cell base station, wherein in the transfer step, when receiving the request in the second transfer request step, the wireless LAN access point receives transfers the user data to the another base station by way of the small cell base station.

In the communication control method according to the sixth embodiment, in the transfer step, when the small cell base station is a home base station that manages a specific cell to which only a specific user terminal having an access right is connectable, and even when the user terminal is not the specific user terminal, the small cell base station transfers the user data transferred from the wireless LAN access point to the another base station.

The communication control method according to the sixth embodiment further comprises: a negative acknowledgment step of sending a negative acknowledgment, by the another base station, to the request in the request step, when it is not possible to satisfy the request in the request step; and a re-request step of re-making, by the user terminal, a request in the request step, when receiving the negative acknowledgment.

In the communication control method according to the sixth embodiment, in the re-request step, the user terminal repeats the request in the request step until the number of times that the negative acknowledgment is received reaches a predetermined value.

In the communication control method according to another embodiment, in the determination step, the wireless LAN access point determines that the connection between the user terminal and the wireless LAN access point becomes difficult, when a signal intensity received from the user terminal is less than a predetermined value.

A communication control method according to the seventh embodiment is a communication control method for allowing a cellular communication system to cooperate with a wireless LAN system, and comprises: a determination step of determining whether or not a connection between a wireless LAN access point directly connected to a small cell base station and a user terminal connected to the wireless LAN access point becomes difficult; a connection step of connecting, by the user terminal, to a small cell managed by the small cell base station, when it is determined that the connection between the user terminal and the wireless LAN access point becomes difficult; and a transfer step of transferring, by the wireless LAN access point, user data on the user terminal owned by the wireless LAN access point to the small cell base station when it is determined that the connection between the user terminal and the wireless LAN access point becomes difficult.

The communication control method according to the seventh embodiment further comprises: a request step of requesting, by the user terminal, to transfer the user data to the small base station when it is determined in the determination step that the connection between the user terminal and the wireless LAN access point becomes difficult, wherein in the transfer step, the wireless LAN access point transfers, on the basis of the request in the request step, the user data to the small cell base station.

In the communication control method according to the seventh embodiment, in the determination step, the user terminal determines that the connection with the wireless LAN access point becomes difficult, when the wireless LAN access point is of collocated type in which the wireless LAN access point is disposed at the same place as the small cell base station, and before a signal intensity received from the small cell base station is less than a predetermined value that is a value by which it is possible to ensure a communication quality, when the signal intensity received from the wireless LAN access point is less than a predetermined value.

In the communication control method according to the seventh embodiment, in the determination step, the wireless LAN access point determines that the connection between the user terminal and the wireless LAN access point becomes difficult, when a signal intensity received from the user terminal is less than a predetermined value.

The communication control method according to the seventh embodiment, further comprises: a handover request step of making, to another base station adjacent to a small cell base station, a handover request requesting the user data transferred from the wireless LAN access point and a handover to a cell immediately after the small cell and the user terminal are connected, when the small cell base station is a home base station configured to manage a specific cell to which only a specific user terminal having an access right is connectable and when the user terminal is not the specific user terminal.

Next, a first embodiment to a seventh embodiment will be described. It is noted that in each of the embodiments, a description proceeds with a focus on a difference from another embodiment, and a like part will not be described where appropriate.

First Embodiment

Hereinafter, with reference to the drawing, an embodiment will be described in which a cellular communication system (an LTE system) configured in compliance with the 3GPP standards is allowed to cooperate with a wireless LAN (WLAN) system.

(System Configuration)

FIG. 1 is a system configuration diagram according to the first embodiment. As shown in FIG. 1, the cellular communication system includes a plurality of UEs (User Equipments) 100, E-UTRAN (Evolved Universal Terrestrial Radio Access Network) 10, and EPC (Evolved Packet Core) 20. The E-UTRAN 10 corresponds to a radio access network. The EPC 20 corresponds to a core network.

The UE 100 is a mobile radio communication device and performs radio communication with a cell with which a connection is established. The UE 100 corresponds to the user terminal. The UE 100 is a terminal (dual terminal) that supports both cellular communication scheme and WLAN communication scheme.

The E-UTRAN 10 includes a plurality of eNBs 200 (evolved Node-Bs). The eNB 200 corresponds to a cellular base station. The eNB 200 manages one or a plurality of cells and performs radio communication with the UE 100 which establishes a connection with the cell of the eNB 200. It is noted that the "cell" is used as a term indicating a minimum unit of a radio communication area, and is also used as a term indicating a function of performing radio communication with the UE 100. Further, the eNB 200, for instance, has a radio resource management (RRM) function, a routing function of user data, and a measurement control function for mobility control and scheduling.

The eNBs 200 are connected mutually via an X2 interface. Further, the eNB 200 is connected to MME/S-GW 500 included in the EPC 20 via an S1 interface.

The EPC 20 includes a plurality of MMEs (Mobility Management Entities)/S-GWs (Serving-Gateways) 500. The MME is a network node for performing various mobility controls, etc., for the UE 100 and corresponds to a controller. The S-GW is a network node that performs transfer control of user data and corresponds to a mobile switching center.

The WLAN system includes WLAN access point (hereinafter, called "AP") 300. The WLAN system is configured to be in compliance with some IEEE 802.11 standards, for example. The AP 300 communicates with the UE 100 in a frequency band (WLAN frequency band) different from a cellular frequency band. The AP 300 is connected to the EPC 20 via a router, etc.

It is noted that there may be one WLAN frequency band; there may be a plurality of WLAN frequency bands (for example, 2.4 GHz band and 5 GHz band). A plurality of WLAN channels may be included in one WLAN frequency band.

Further, it is not limited to the case where the eNB 200 and the AP 300 are separately disposed. The eNB 200 and the AP 300 may be disposed in the same place (Collocated). The eNB 200 and the AP 300 are directly connected by arbitrary interface of an operator as one embodiment of Collocated.

Subsequently, a configuration of the UE 100, the eNB 200, and the AP 300 will be described.

Figure 2:
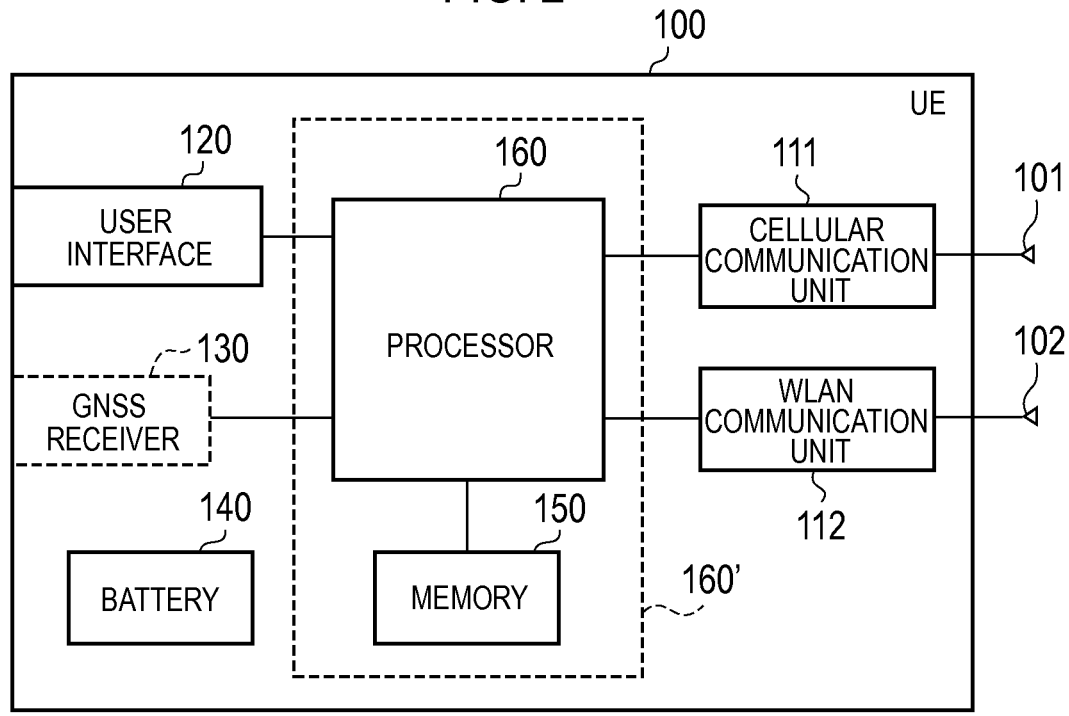
FIG. 2 is a block diagram of an UE (an user terminal) according to the first embodiment and the second embodiment.

FIG. 2 is a block diagram of the UE 100. As shown in FIG. 2, the UE 100 includes: antennas 101 and 102; a cellular communication unit (a cellular transceiver) 111; a WLAN communication unit (a WLAN transceiver) 112; a user interface 120; a GNSS (Global Navigation Satellite System) receiver 130; a battery 140; a memory 150; and a processor 160. The memory 150 and the processor 160 configure a controller. Alternatively, the memory 150 configures a storage and the processor 160 configures a controller. The UE 100 may not have the GNSS receiver 130. Furthermore, the memory 150 may be integrally formed with the processor 160, and this set (that is, a chipset) may be called a processor 160' configuring a controller (and a storage).

The antenna 101 and the cellular communication unit 111 are used for transmitting and receiving a cellular radio signal. The cellular communication unit 111 converts a baseband signal output from the processor 160 into the cellular radio signal, and transmits the same from the antenna 101. Further, the cellular communication unit 111 converts the cellular radio signal received by the antenna 101 into the baseband signal, and outputs the same to the processor 160.

The antenna 102 and the WLAN communication unit 112 are used for transmitting and receiving a WLAN radio signal. The WLAN communication unit 112 converts the baseband signal output from the processor 160 into a WLAN radio signal, and transmits the same from the antenna 102. Further, the WLAN communication unit 112 converts the WLAN radio signal received by the antenna 102 into a baseband signal, and outputs the same to the processor 160.

The user interface 120 is an interface with a user carrying the UE 100, and includes, for example, a display, a microphone, a speaker, and various buttons. Upon receipt of the input from a user, the user interface 120 outputs a signal indicating a content of the input to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes the baseband processor that performs modulation and demodulation, and encoding and decoding on the baseband signal and a CPU that performs various processes by executing the program stored in the memory 150. The processor 160 may further include a codec that performs encoding and decoding on sound and video signals. The processor 160 executes various processes and various communication protocols described later.

Figure 3:
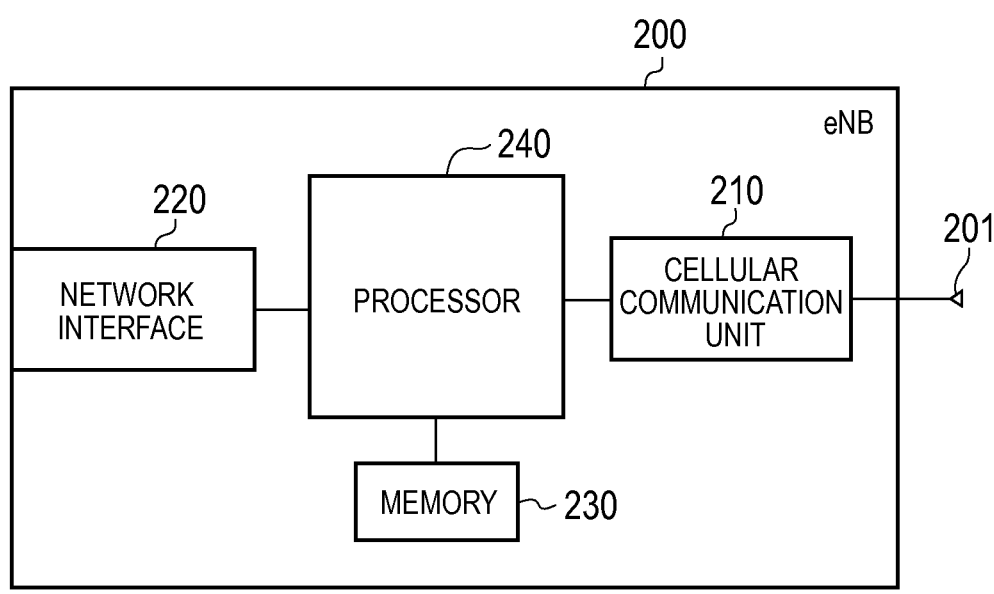
FIG. 3 is a block diagram of an eNB (a cellular base station) according to the first embodiment and the second embodiment.

FIG. 3 is a block diagram of the eNB 200. As shown in FIG. 3, the eNB 200 includes an antenna 201, a cellular communication unit (a cellular transceiver) 210, a network interface 220, a memory 230, and a processor 240. The memory 230 and the processor 240 configure a controller. Furthermore, the memory 230 may be integrally formed with the processor 240, and this set (that is, a chipset) may be called a processor configuring a controller.

The antenna 201 and the cellular communication unit 210 are used for transmitting and receiving a cellular radio signal. The cellular communication unit 210 converts the baseband signal output from the processor 240 into the cellular radio signal, and transmits the same from the antenna 201. Furthermore, the cellular communication unit 210 converts the cellular radio signal received by the antenna 201 into the baseband signal, and outputs the same to the processor 240.

The network interface 220 is connected to the neighboring eNB 200 via an X2 interface and is connected to the MME/S-GW 500 via the S1 interface. Further, the network interface 220 is used for communication with the AP 300 via the EPC 20.

The memory 230 stores a program to be executed by the processor 240 and information to be used for a process by the processor 240. The processor 240 includes the baseband processor that performs modulation and demodulation, encoding and decoding and the like on the baseband signal and a CPU that performs various processes by executing the program stored in the memory 230. The processor 240 implements various processes and various communication protocols described later.

Figure 4:
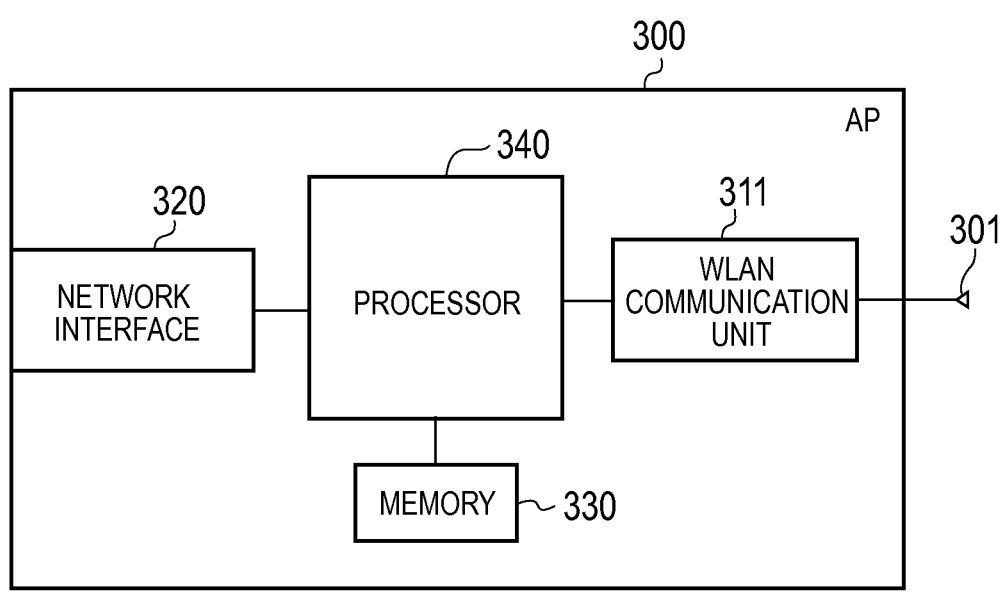
FIG. 4 is a block diagram of an AP (an access point) according to the first embodiment and the second embodiment.

FIG. 4 is a block diagram of the AP 300. As shown in FIG. 4, the AP 300 includes an antenna 301, a WLAN communication unit (a WLAN transceiver) 311, a network interface 320, a memory 330, and a processor 340. The memory 330 and the processor 340 configure a controller. Furthermore, the memory 330 may be integrally formed with the processor 340, and this set (that is, a chipset) may be called a processor configuring a controller.

The antenna 301 and the WLAN communication unit 311 are used for transmitting and receiving the WLAN radio signal. The WLAN communication unit 311 converts the baseband signal output from the processor 340 into the WLAN radio signal and transmits the same from the antenna 301. Further, the WLAN communication unit 311 converts the WLAN radio signal received by the antenna 301 into the baseband signal and outputs the same to the processor 340.

The network interface 320 is connected to the EPC 20 via a router, etc. Further, the network interface 320 is used for communication with the eNB 200 via the EPC 20.

The memory 330 stores a program executed by the processor 340 and information used for a process by the processor 340. The processor 340 includes the baseband processor that performs modulation and demodulation, and encoding and decoding on the baseband signal and a CPU that performs various processes by executing the program stored in the memory 330.

Figure 5:
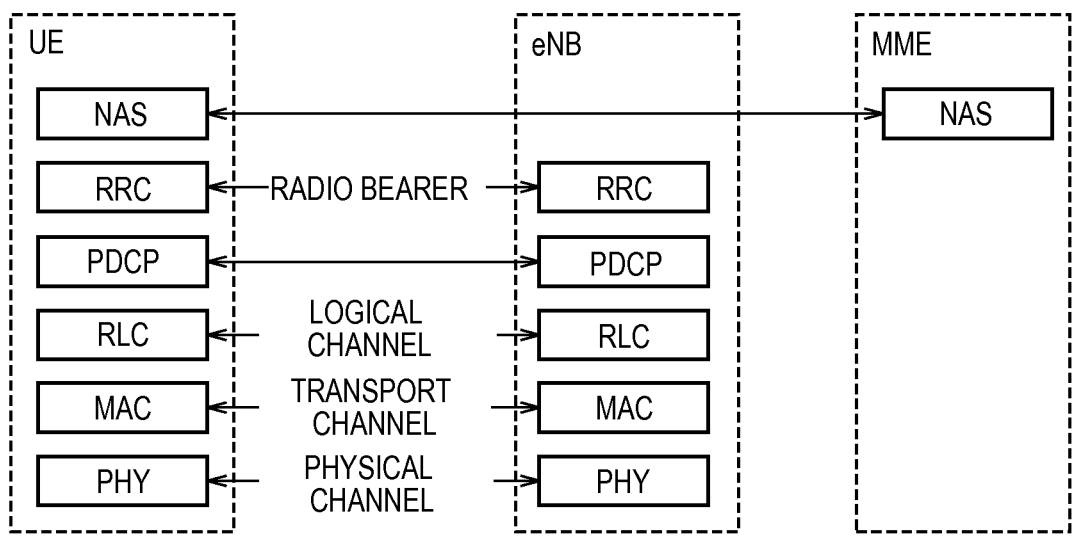
FIG. 5 is a protocol stack diagram of a radio interface in an LTE system.

FIG. 5 is a protocol stack diagram of a radio interface in the cellular communication system. As shown in FIG. 5, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs priority control of data, and a retransmission process and the like by hybrid ARQ (HARQ). Between the MAC layer of the UE 100 and the MAC layer of the eNB 200, data is transmitted via a transport channel. The MAC layer of the eNB 200 includes a scheduler for selecting a transport format (a transport block size, a modulation and coding scheme and the like) of an uplink and a downlink, and an assigned resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in a connected state (RRC connected state); otherwise, the UE 100 is in an idle state (RRC idle state).

A NAS (Non-Access Stratum) layer positioned above the RRC layer performs session management or mobility management, for example.

Figure 6:
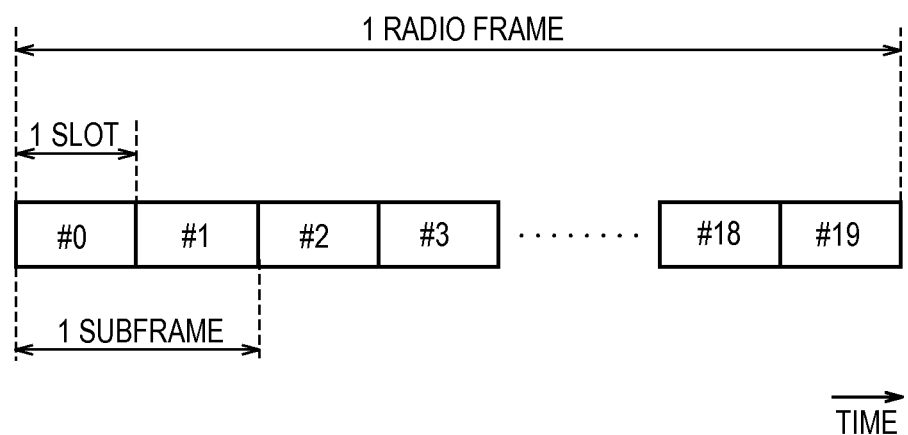
FIG. 6 is a configuration diagram of a radio frame used in the LTE system.

FIG. 6 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As shown in FIG. 6, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction.

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the remaining interval of each subframe is a region that can be mainly used as a physical downlink shared channel (PDSCH). Furthermore, in the downlink, reference signals such as cell-specific reference signals are distributed and arranged in each subframe.

In the uplink, both ends, in the frequency direction, of each subframe are control regions mainly used as a physical uplink control channel (PUCCH). Furthermore, the center portion, in the frequency direction, of each subframe is a region that can be mainly used as a physical uplink shared channel (PUSCH).

Operation According to First Embodiment

Next, an operation according to the first embodiment will be described.

(1) Operation Environment

Figure 7:
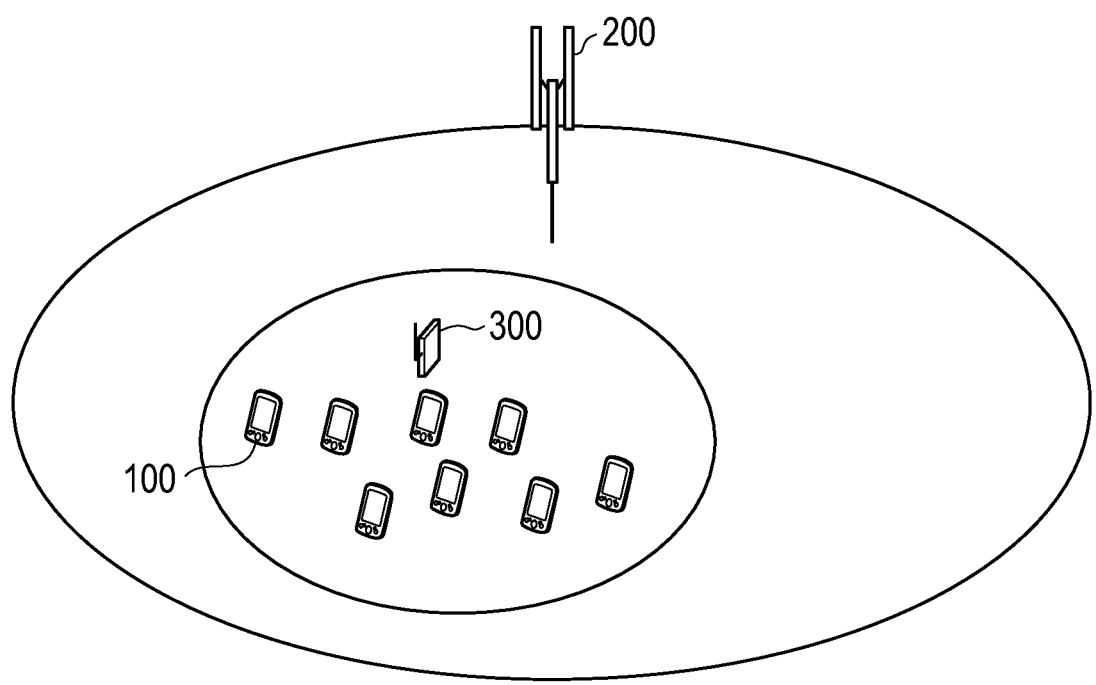
FIG. 7 is a diagram for describing operation environment according to the first embodiment and the second embodiment.

FIG. 7 is a diagram for describing operation environment according to the first embodiment. As shown in FIG. 7, the AP 300 is provided in coverage of the eNB 200. The AP 400 is an AP (an Operator controlled AP) managed by an operator.

Further, a plurality of UEs 100 is located within the coverage of the eNB 200 and within coverage of the AP 300. The UE 100 establishes a connection with the eNB 200 and performs cellular communication with the eNB 200. Specifically, the UE 100 transmits and receives cellular radio signal including traffic (user data) with the eNB 200. Alternatively, some UEs 100 may not establish the connection with the eNB 200.

A load level of the eNB 200 becomes high when the eNB 200 establishes connections with a large number of UEs 100. The load level means congestion degree of the eNB 200 such as traffic load of the eNB 200 or radio resource usage rate of the eNB 200.

The traffic load of the eNB 200 can be transferred (offloaded) to the AP 300 by switching so that traffic transmitted and received between the eNB 200 and the UE 100 is transmitted and received between the AP 300 and the UE 100.

However, the UE 100 becomes the idle state of cellular communication during performing the offload because of releasing the connection with the eNB 200 when the UE 100 generally establishes the connection with the AP 300.

Thus, an inefficient operation (so-called ping-pong phenomenon) that the connection between the UE 100 and the eNB 200 is anew established may occur in such a case that communication status between the UE 100 and the AP 300 deteriorates after establishing the connection between the UE 100 and the AP 300.

Figure 8:
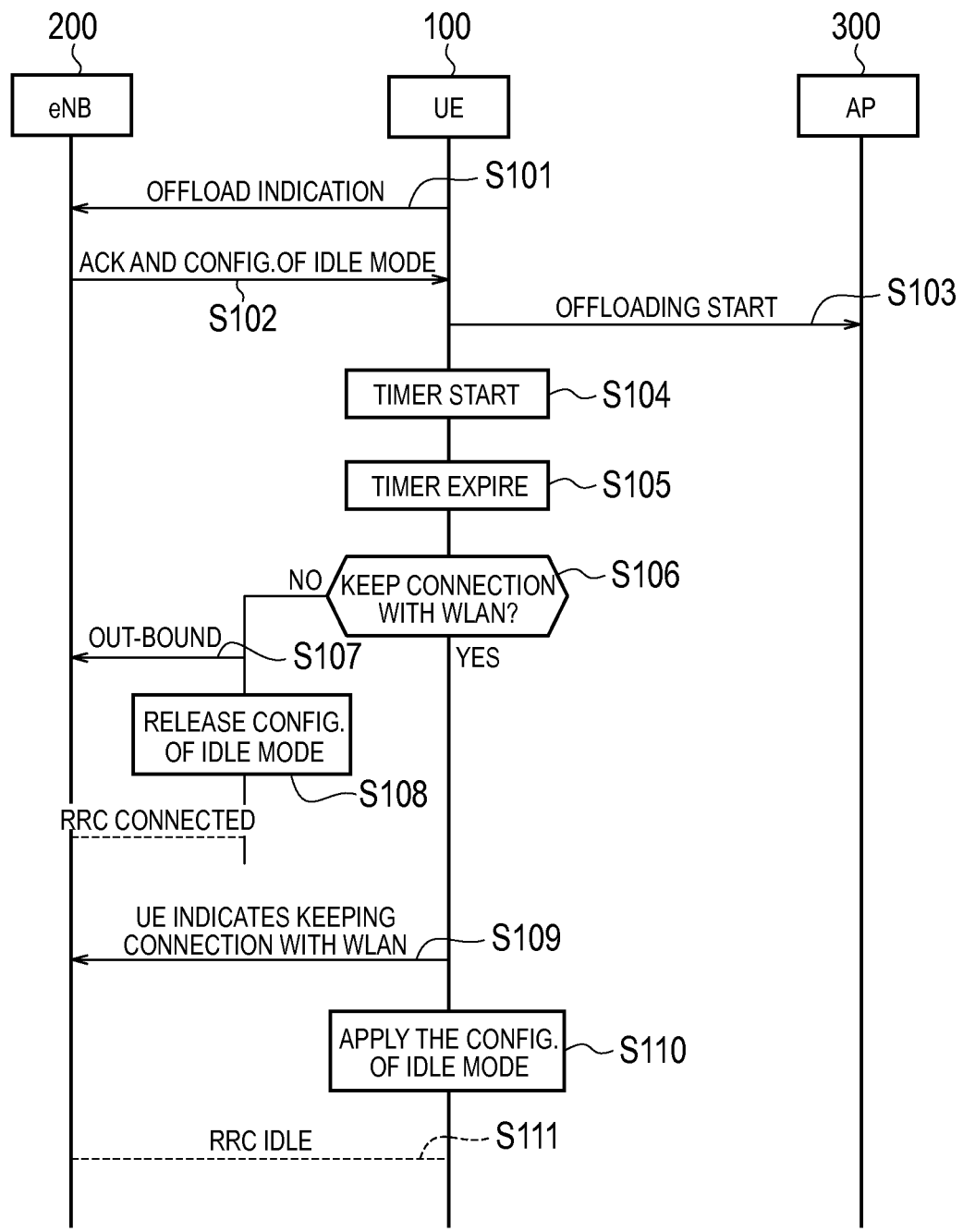
FIG. 8 is a sequence diagram of an operation pattern 1 according to the first embodiment.

Hereinafter, an operation according to the first embodiment for resolving this defect will be described (2) Operation Pattern 1 According to the First Embodiment FIG. 8 is a sequence diagram of an operation pattern 1 according to the first embodiment. In an initial state of the present sequence, the UE 100 is in a state in which the UE 100 has established a RRC connection (a first connection) with the eNB 200.

As shown in FIG. 8, in step S101, when the UE 100 decides on starting of the offload, the UE 100 transmits an offload notification to that effect to the eNB 200.

In step S102, the eNB 200 transmits an acknowledgment (an Ack) to the UE 100 in response to a receipt of the offload notification from the UE 100. The eNB 200 transmits configuration information (hereinafter called "idle time configuration information") for configuration of an operation (that is, an operation in the idle state) of the UE 100 after the RRC connection is released, to the UE 100 along with the Ack. When the UE 100 receives the idle time configuration information along with the Ack, the UE 100 stores the received idle time configuration information. The idle time configuration information is information similar to information included in a RRC release message (a RRC Connection Release) and information (such as freqPriorityList, idleModeMobilityControlInfo) for providing priority of cell reselection (Refer to 3GPP technical specification "TS 36.300").

In step S103, the UE 100 establishes a connection (a second connection) with the AP 300 in response to a receipt of the Ack from the eNB 200, and then the offload is started. Specifically, the UE 100 switches the traffic transmitted and received with the eNB 200 so as to be transmitted and received with the AP 300.

The UE 100 and the eNB 200 maintain without releasing the RRC connection even when the offload is started. Thus, the UE 100 maintains the connection state of the cellular communication without transition to the idle state of the cellular communication even when the offload is started.

In step S104, the UE 100 activates a timer for measuring a predetermined time.

When the timer expires in step S105, the UE 100 determines whether the offload is continued or not in step S106. In other words, the UE 100 determines whether the UE 100 switches the traffic transmitted and received with the AP 300 so as to be transmitted and received with the eNB 200. The UE 100 carries out the determination on the basis of a communication status with the AP 300. The communication status with the AP 300 is radio link status between the UE 100 and the AP 300 and/or network status relevant to the AP 300. The radio link status between the UE 100 and the AP 300 is signal intensity of beacon signal, radio link stability degree and the like. The network status relevant to the AP 300 is load level of the AP 300 and the like. For example, when the communication status between the UE 100 and the AP 300 is good, the UE 100 determines that the offload is continued, and otherwise the UE 100 determines that the offload is cancelled.

When it is determined that the offload is cancelled (in step S106: No), the UE 100 cancels the offload in step S107. In other words, the UE 100 switches the traffic transmitted and received with the AP 300 so as to be transmitted and received with the eNB 200. Further, in step S108, the UE 100 discards the idle time configuration information stored in step S102. Also, the UE 100 may release the connection of the AP 300.

On the other hand, when it is determined that the offload is continued (in step S106: Yes), the UE 100 transmits notification indicating that the offload is continued to the eNB 200 in step S109. As a result, the UE 100 and the eNB 200 release the RRC connection. Further, the UE 100 transits from the connection state of the cellular communication to the idle state.

In step S110, the UE 100 applies the idle time configuration information stored in step S102. Then, in step S111, the UE 100 performs an operation in the idle state on the basis of the idle time configuration information.

(3) Operation Pattern 2 According to the First Embodiment

Figure 9:
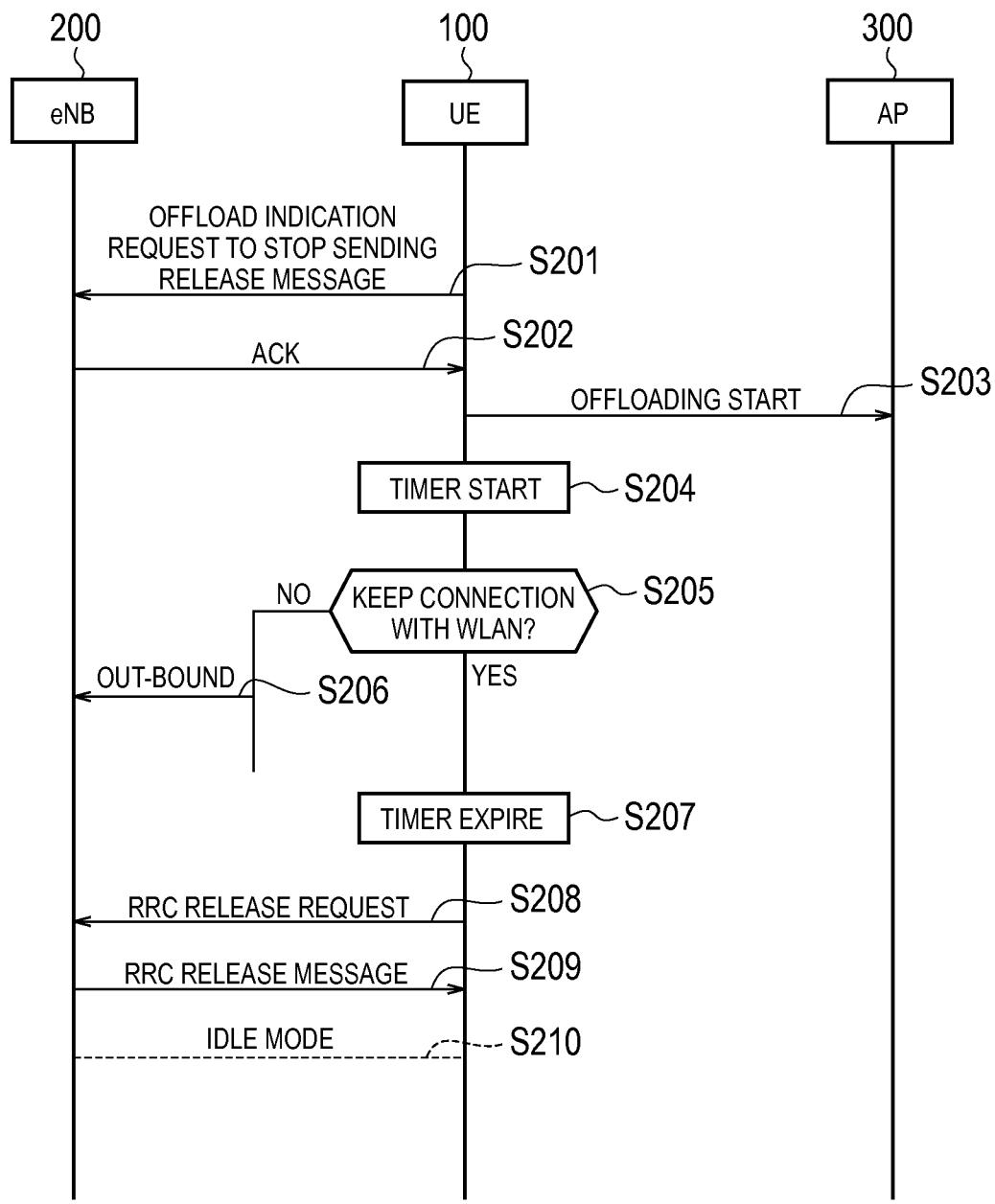
FIG. 9 is a sequence diagram of an operation pattern 2 according to the first embodiment.

FIG. 9 is a sequence diagram of an operation pattern 2 according to the first embodiment. In an initial state of the present sequence, the UE 100 is in a state in which the UE 100 has established the RRC connection (the first connection) with the eNB 200.

As shown in FIG. 9, in step S201, when the UE 100 decides on starting of the offload, the UE 100 transmits an offload notification to that effect to the eNB 200. The UE 100 transmits transmission stop request for requesting to stop transmitting a release instruction (a RRC release message) of the RRC connection along with the offload notification. The eNB 200 sets a stopping transmitting the RRC release message to the UE 100 in the response to a receipt of the transmission stop request.

In step S202, the eNB 200 transmits an acknowledgment (an Ack) to the UE 100 in the response to a receipt of the offload notification from the UE 100.

In step S203, the UE 100 establishes the connection (the second connection) with the AP 300 on the basis of the Ack from the eNB 200, and then the offload is started. Specifically, the UE 100 switches the traffic transmitted and received with the eNB 200 so as to be transmitted and received with the AP 300.

The UE 100 and the eNB 200 maintain without releasing the RRC connection even when the offload is started. Thus, the UE 100 maintains the connection state of the cellular communication without transition to the idle state of the cellular communication even when the offload is started.

In step S204, the UE 100 activates a timer for measuring a predetermined time.

In step S205, the UE 100 determines whether the offload is continued or not. A method of determination is the same as that of the operation pattern 1.

When it is determined that the offload is cancelled (in step S205: No), the UE 100 cancels the offload in step S206. In other words, the UE 100 switches the traffic transmitted and received with the AP 300 so as to be transmitted and received with the eNB 200. Also, the UE 100 may release the connection of the AP 300.

On the other hand, when it is determined that the offload is continued (in step S205: Yes) and when the timer expires (in step S207), the UE 100 transmits a transmission request to request to transmit the RRC release message to the eNB 200 in step S208.

In step S209, the eNB 200 transmits the RRC release message to the UE 100 in a response to a receipt of the transmission request of the RRC release message. The RRC release message includes the idle time configuration information for configuration of an operation of the UE 100 after the RRC connection is released. As a result, the UE 100 and the eNB 200 release the RRC connection. Further, the UE 100 transits from the connection state of the cellular communication to the idle state. Then in step S210, the UE 100 performs an operation in the idle state on the basis of the idle time configuration information.

Conclusion of the First Embodiment

In the first embodiment, the UE 100 that have established the RRC connection with the eNB 200 maintains without releasing the RRC connection even when the offload is started after establishing the connection with the AP 300. Further, the UE 100 determines whether the offload is continued or canceled after the offload is started. Thus, the above ping-pong phenomenon can be avoided by maintaining without releasing the RRC connection even when the offload is started.

In the first embodiment, the UE 100 carries out the determination on the basis of the communication status with the AP 300. Thus, the UE 100 can respond to change in the communication status with the AP 300 after the offload.

In the operation pattern 1, the UE 100 receives from the eNB 200, before the RRC connection is released, the idle time configuration information for configuration of the operation of the UE 100 after the RRC connection is released. Thereby, the UE 100 can performs the proper operation after the RRC connection is released (that is, in the idle state).

In the operation pattern 1, the UE 100 transmits the notification indicating that the offload is continued, to the eNB 200, when it is determined that the offload is continued. Then, the UE 100 releases the RRC connection after the notification is transmitted. Thereby, the UE 100 can voluntarily release the RRC connection in a case where there is no problem releasing the RRC connection. In addition, cellular resource is saved by releasing the RRC connection.

In the operation pattern 1, the UE 100 cancels the offload and discards the idle time configuration information when it is determined that the offload is canceled. Thereby, memory can be saved by discarding unnecessary idle time configuration information.

In the operation pattern 2, the UE 100 transmits, to the eNB 200, the transmission stop request for requesting to stop transmitting the RRC release message before the offload is started. Thereby, the UE 100 can prevent the eNB 200 from releasing the RRC connection.

In the operation pattern 2, the UE 100 transmits to the eNB 200 the transmission request to request to transmit the RRC release message when it is determined that the offload is continued, and the UE 100 receives the RRC release message from the eNB 200. Thereby, the UE 100 can voluntarily release the RRC connection in a case where there is no problem releasing the RRC connection. Also, the RRC release message includes the idle time configuration information. Thus, the UE 100 can performs the proper operation after the RRC connection is released (that is, in the idle state).

Second Embodiment

The second embodiment will be described while focusing on the difference from the first embodiment. Operation environment according to the second embodiment is similar to that of the first embodiment.

Operation According to Second Embodiment

In the above first embodiment, the timer comprised by each of the UE 100 and the eNB 200 is not described in detail. The second embodiment is an embodiment in which these timers are focused. As described above, the UE 100 comprises a terminal-side timer (hereinafter called an "UE timer") that regulates a connection maintaining period during which the RRC connection should be maintained after the offload is started. The UE 100 activates the terminal-side timer when the offload is started (refer to step S104 in FIG. 8 and step S204 in FIG. 9). Then, the UE 100 maintains the RRC connection until the UE timer expires.

On the other hand, the eNB 200 comprises a base station-side timer (hereinafter called an "eNB timer") that regulates a connection maintaining period during which the RRC connection should be maintained after transmission and reception of traffic with the UE 100 is stopped. This eNB timer may be called an Inactivity timer. The eNB 200 activates the eNB timer when transmission and reception of traffic with the UE 100 is stopped. Further, the eNB 200 maintains the RRC connection until the eNB timer expires, transmits the RRC release message to the UE 100 when the eNB timer expires, and then releases the RRC connection.

Here, there is a possibility that competition occurs between the UE timer and the eNB timer. Specifically, in a case where the connection maintaining period set to the eNB timer is shorter than the connection maintaining period set to the UE timer, the eNB timer expires before the UE timer expires, and then the eNB 200 releases the RRC connection. Hereinafter, operation according to the second embodiment for resolving this defect will be described.

(1) Operation Pattern 1 According to the Second Embodiment

The operation pattern 1 according to the second embodiment is a pattern in which a suitable connection maintaining period is preliminarily set to the UE timer. Specifically, the connection maintaining period set to the UE timer is equal to or shorter than the connection maintaining period set to the eNB timer. In other words, the connection maintaining period set to the eNB timer is equal to or longer than the connection maintaining period set to the UE timer. Thus, the eNB timer can be prevented from expiring before the UE timer expires.

(2) Operation Pattern 2 According to the Second Embodiment

The operation pattern 2 according to the second embodiment is a pattern in which the UE transmits and receives the traffic with the AP 300 and transmits and receives the traffic with the eNB 200 to prevent the eNB timer from expiring (or to stop the eNB timer) after the offload is started.

For example, "the UE transmits and receives the traffic with the eNB 200 to prevent the eNB timer from expiring" means an operation in which a part of traffic (bearers) is left for the eNB 200. This operation can basically apply in a case where the UE 100 uses a plurality of services via the eNB 200. However, the connection state may be maintained by generating dummy traffic (keep arrive message) and periodically transmitting the dummy traffic to the eNB 200 even when the UE 100 uses only one service. The keep arrive message may be a message of upper layer (for example, a message transmitted to a server owned by an operator) or a message of lower layer (for example, a message exchanged among the MAC layer).

Figure 10:
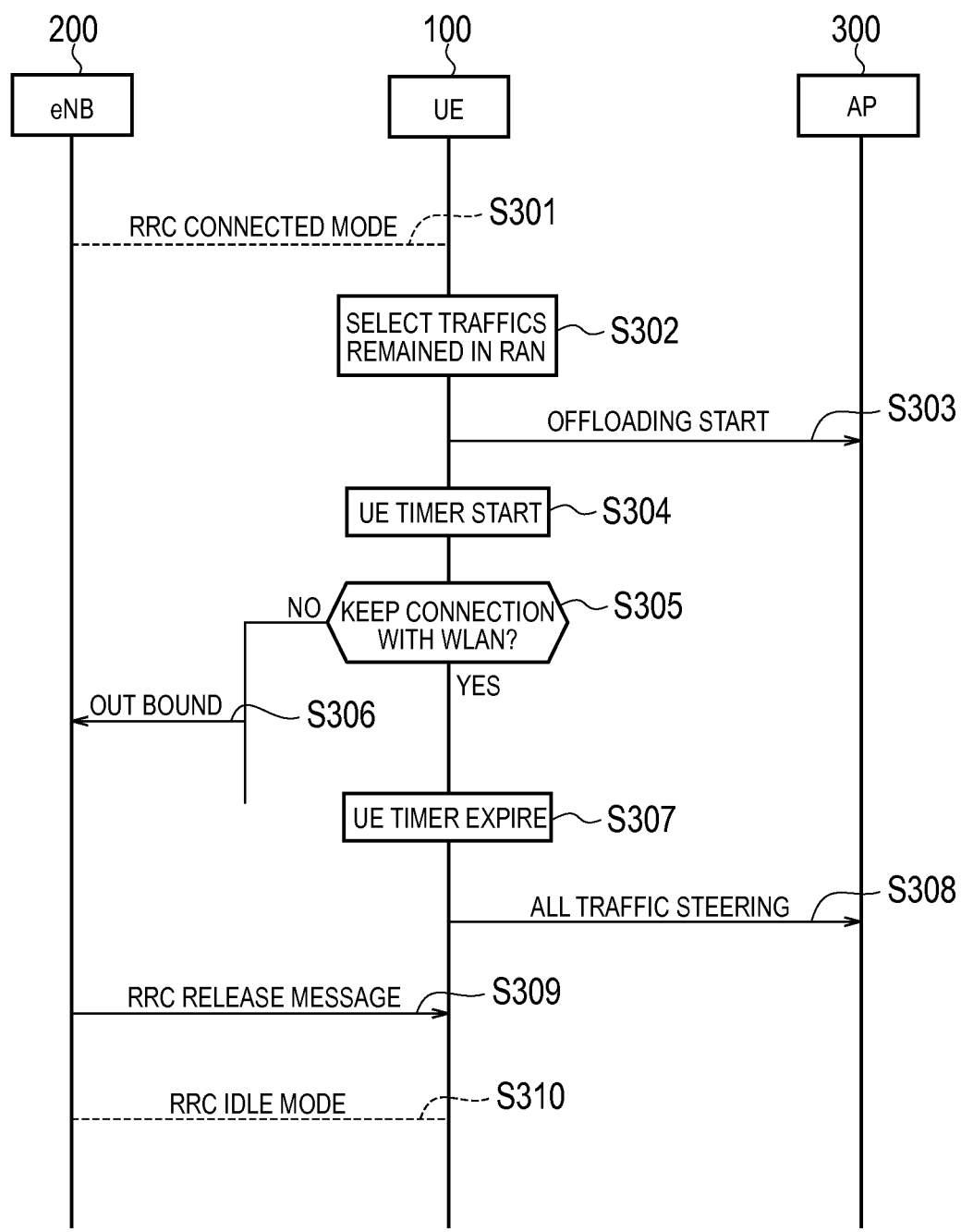
FIG. 10 is a sequence diagram of an operation pattern 2 according to the second embodiment.

FIG. 10 is a sequence diagram of the operation pattern 2 according to the second embodiment. In the present sequence, an operation in which a part of traffic is left for the eNB 200 will be described as an example. In an initial state of the present sequence, the UE 100 is in a state in which the UE 100 has established the RRC connection (the first connection) with the eNB 200 (in step S301).

As shown FIG. 10, in step S302, when the UE 100 decides that the offload is started, the UE 100 selects traffic which is left for the eNB 200. A selection criterion is QoS type or service type and the like. For example, the UE 100 may determine that operator-unique service (service unique to an operator line that cannot be provided via the WLAN) is preferentially left for the eNB 200.

In step S303, the UE 100 establishes a connection (a second connection) with the AP 300 and then the offload is started. Specifically, the UE 100 switches traffic other than traffic which is left for the eNB 200 from traffics transmitted and received with the eNB 200 so as to be transmitted and received with the AP 300.

The UE 100 and the eNB 200 maintain without releasing the RRC connection even when the offload is started. Thus, the UE 100 maintains the connection state of the cellular communication without transition to the idle state of the cellular communication even when the offload is started.

In step S304, the UE 100 activates the UE timer in response to the start of the offload.

In step S305, the UE 100 determines whether the offload is continued or not. A method of determination is the same as that of the first embodiment.

When it is determined that the offload is canceled (in step S305: No), the UE 100 cancels the offload in step S306. In other words, the UE 100 switches the traffic transmitted and received with the AP 300 so as to be transmitted and received with the eNB 200. Also, the UE 100 may release the connection of the AP 300.

On the other hand, in a case where it is determined that the offload is continued (in step S305: Yes) and when the UE timer expires (in step S307), the UE 100 switches the traffic which is left for the eNB 200 so as to be transmitted and received with the AP 300 in step S308.

The eNB 200 activates the eNB timer in response to the traffic of the UE 100 having been lost, and then the eNB timer expires.

In step S309, the eNB 200 transmits the RRC release message to the UE 100. The RRC release message includes the idle time configuration information for configuration of an operation of the UE 100 after the RRC connection is released. As a result, the UE 100 and the eNB 200 release the RRC connection. Further, the UE 100 transits from the connection state of the cellular communication to the idle state (in step S310). Then, the UE 100 performs an operation in the idle state on the basis of the idle time configuration information.

(3) Operation Pattern 3 According to the Second Embodiment

The operation pattern 3 according to the second embodiment is a pattern in which the eNB 200 inquires the UE 100 of whether it is possible to release the RRC connection in a case where the release request for the RRC connection is not received from the UE 100 when the eNB timer expires in the eNB 200. In other words, the eNB 200 cannot release the RRC connection until an approval is gained from the UE 100.

Figure 11:
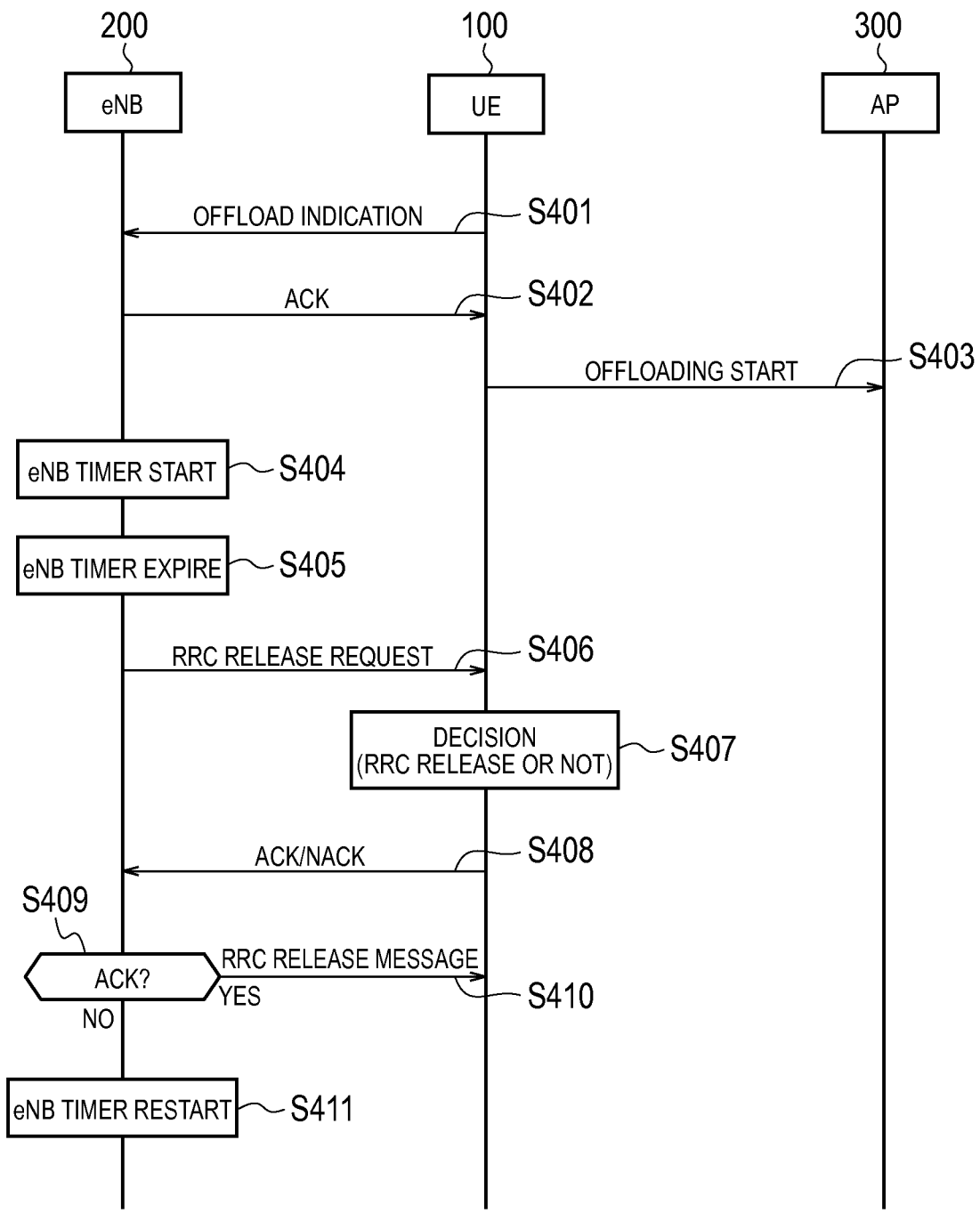
FIG. 11 is a sequence diagram of an operation pattern 3 according to the second embodiment.

FIG. 11 is a sequence diagram of the operation pattern 3 according to the second embodiment. In an initial state of the present sequence, the UE 100 is in a state in which the UE 100 has established the RRC connection (the first connection) with the eNB 200.

As shown FIG. 11, in step S401, when the UE 100 decides on starting of the offload, the UE 100 transmits an offload notification to that effect to the eNB 200.

In step S402, the eNB 200 transmits an acknowledgment (an Ack) to the UE 100 in response to a receipt of the offload notification from the UE 100.

In step S403, the UE 100 establishes a connection (a second connection) with the AP 300 in response to a receipt of the Ack from the eNB 200, and then the UE 100 starts the offload. Specifically, the UE 100 switches the traffic transmitted and received with the eNB 200 so as to be transmitted and received with the AP 300. In addition, the UE 100 activates the UE timer in a response to the start of the offload.

The UE 100 and the eNB 200 maintain without releasing the RRC connection even when the offload is started. Thus, the UE 100 maintains the connection state of the cellular communication without transition to the idle state of the cellular communication even when the offload is started.

In step S404, the eNB 200 activates the eNB timer in response to the traffic of the UE 100 having been lost.

In step S405, the eNB timer expires. In step S406, the eNB 200 transmits release request for the RRC connection to the UE 100 when the eNB timer expires. The release request corresponds to an inquiring of whether it is possible to release the RRC connection. Also, the release request can be regarded as a notification indicating that the eNB timer expires.

In step S407, the UE 100 determines whether the release request for the RRC connection received from the eNB 200. Since, during the UE timer running, the UE 100 carries out the determination whether the offload is continued or not, the UE 100 determines that the RRC release request is rejected when the UE 100 receives the release request for the RRC connection from the eNB 200 during the UE timer running. On the other hand, UE 100 determines that the RRC release request is accepted when the UE 100 receives the release request for the RRC connection from the eNB 200 after the UE timer expires.

In step S408, the UE 100 transmits, to the eNB 200, a determination result of whether the release request for the RRC connection is accepted or rejected. The UE 100 transmits an Ack to the eNB 200 in a case where the release request for the RRC connection is accepted, and transmits a Nack to the eNB 200 in a case where the release request for the RRC connection is rejected.

In step S409, the eNB 200 verifies whether the Ack has been received or the Nack has been received from the UE 100.

When the Ack has been received from the UE 100 (in step S409: Yes), the eNB 200 transmits the RRC release message to the UE 100 in step S410.

On the other hand, when the Nack has been received from the UE 100 (in step S409: No), the eNB 200 restarts the eNB timer in step S411. The connection maintaining period set to the eNB timer in the restart may be the same as the initial connection maintaining period, or may be different from the initial connection maintaining period (for instance, a connection maintaining period shorter than the initial connection maintaining period).

(4) Operation Pattern 4 According to the Second Embodiment

The operation pattern 4 according to the second embodiment is a pattern in which the eNB 200 controls the eNB timer in order to prevent the eNB timer from expiring before the UE timer expires. There are the following three methods (operation patterns 4-1 to 4-3) as a method of controlling the eNB timer.

In the operation pattern 4-1 according to the second embodiment, the eNB timer includes a general eNB timer (a first eNB timer) used for a purpose of other than the offload and an offload eNB timer (a second eNB timer) used for a purpose of the offload. A connection maintaining period set to the offload eNB timer is equal to or longer than the connection maintaining period notified to the UE 100. The eNB 200 selects the offload eNB timer and then activates the offload eNB timer in response to the start of the offload.

In the operation pattern 4-2 according to the second embodiment, the eNB 200 notifies the UE 100 of the connection maintaining period that should be set to the UE timer. It is preferable that this notification is a notification by broadcasting (for example, a notification by the SIB). However, this notification may be a notification by unicasting. The eNB 200 sets a connection maintaining period equal to or longer than the connection maintaining period notified to the UE 100, to the eNB timer.

In the operation pattern 4-3 according to the second embodiment, the eNB 200 cancels the activation of the eNB 200 timer in response to the start of the offload. In this case, the eNB 200 may set the connection maintaining period equal to or longer than the connection maintaining period set to the UE timer, to the eNB timer in a case where the eNB 200 knows the connection maintaining period set to the UE timer. Alternatively, as described in the first embodiment, the release processing of the RRC connection may be performed at the initiative of the UE.

Also, in the operation patterns 4-2 and 4-3 according to the second embodiment, the eNB 200 may acquire information indicating the connection maintaining period set to the UE timer from the UE 100. In this case, for example, the UE 100 may include information indicating the connection maintaining period set to the UE timer in the UE Capability message, for instance, and transmit the information to the eNB 200.

Figure 12:
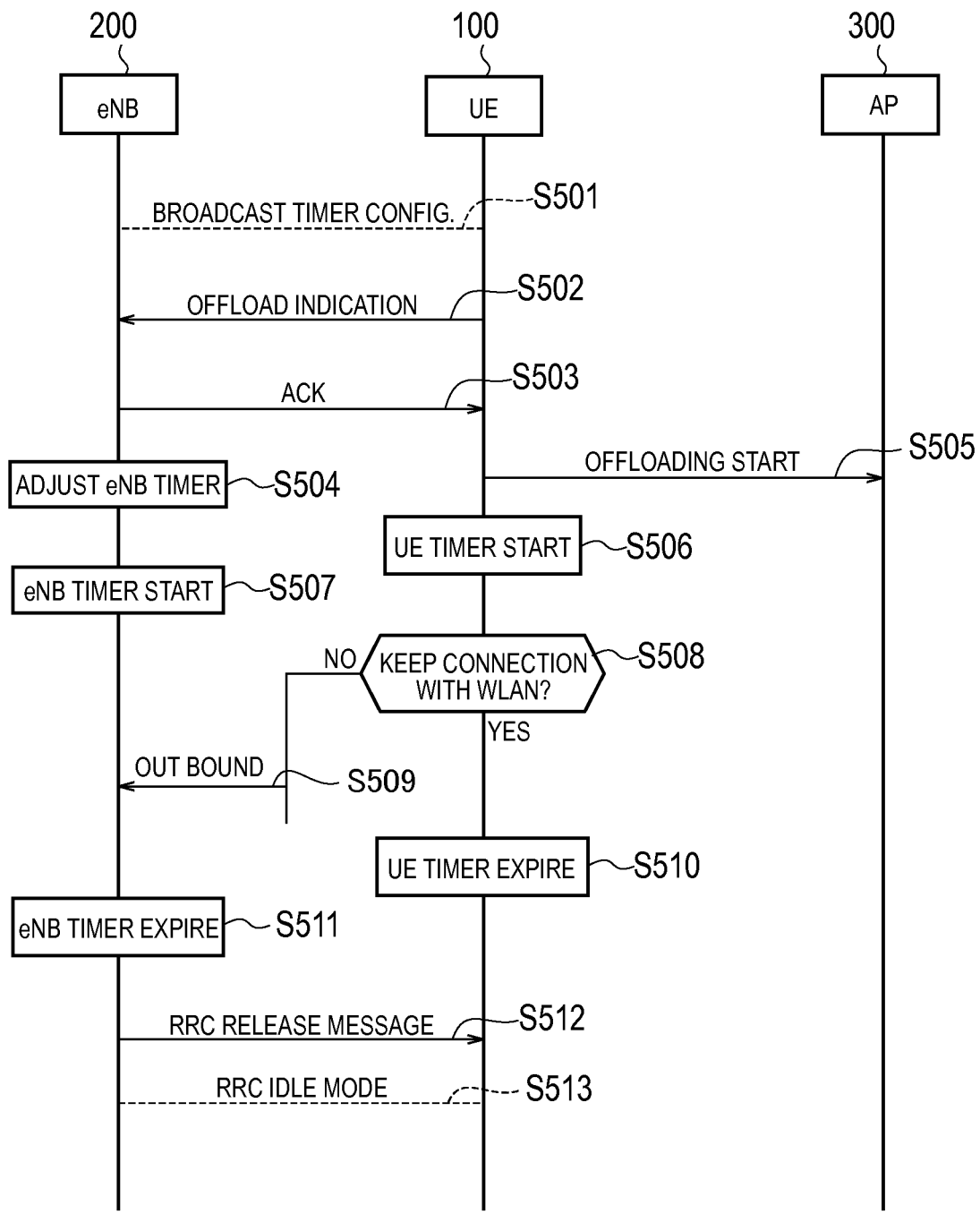
FIG. 12 is a sequence diagram of an operation pattern 4 according to the second embodiment.

FIG. 12 is a sequence diagram of the operation pattern 4 according to the second embodiment. The operation pattern 4-2 is mainly assumed here. In an initial state of the present sequence, the UE 100 is in a state in which the UE 100 has established the RRC connection (the first connection) with the eNB 200.

As shown in FIG. 12, in step S501, the eNB 200 transmits the information indicating the connection maintaining period that should be set to the UE timer to the UE 100 by broadcasting. The UE 100 sets the connection maintaining period indicated by the information received from the eNB 200 to the UE timer.

In step S502, when the UE 100 decides on starting of the offload, the UE 100 transmits an offload notification to that effect to the eNB 200.

In step S503, the eNB 200 transmits an acknowledgment (an Ack) to the UE 100 in response to a receipt of the offload notification from the UE 100.

In step S504, the eNB 200 sets the connection maintaining period equal to or longer than the connection maintaining period set to the UE timer to the eNB timer. Also, step S504 may be between step S501 and step S502 or between step S502 and step S503.

In step S505, the UE 100 establishes the connection (the second connection) with the AP 300 in response to a receipt of the Ack from the eNB 200, and then the offload is started. Specifically, the UE 100 switches the traffic transmitted and received with the eNB 200 so as to be transmitted and received with the AP 300.

The UE 100 and the eNB 200 maintain without releasing the RRC connection even when the offload is started. Thus, the UE 100 maintains the connection state of the cellular communication without transition to the idle state of the cellular communication even when the offload is started.

In step S506, the UE 100 activates the UE timer in response to the start of the offload.

In step S507, the eNB 200 activates the eNB timer in response to the traffic of the UE 100 having been lost.

In step S508, during the UE timer running, the UE 100 carries out the determination whether the offload is continued or not. A method of determination is the same as that of the first embodiment.

When it is determined that the offload is canceled (in step S508: No), the UE 100 cancels the offload in step S509. In other words, the UE 100 switches the traffic transmitted and received with the AP 300 so as to be transmitted and received with the eNB 200. Also, the UE 100 may release the connection of the AP 300.

In step S510, the UE timer expires.

In step S511, the eNB timer expires. Timing of the eNB timer expiring is later than timing of the UE timer expiring.

In step S512, the eNB 200 transmits the RRC release message to the UE 100 in a response to the expiration of the eNB timer. The RRC release message includes the idle time configuration information for configuration of an operation of the UE 100 after the RRC connection is released. As a result, the UE 100 and the eNB 200 release the RRC connection. Further, the UE 100 transits from the connection state of the cellular communication to the idle state (in step S513). Then, the UE 100 performs an operation in the idle state on the basis of the idle time configuration information.

Conclusion of the Second Embodiment

In the operation pattern 1 according to the second embodiment, the connection maintaining period set to the UE timer is equal to or shorter than the connection maintaining period set to the eNB timer. Thus, the eNB timer is prevented from expiring before the UE timer expires without modifying the existing eNB timer.

In the operation pattern 2 according to the second embodiment, the UE 100 transmits and receives the traffic with the AP 300 and transmits and receives the traffic with the eNB 200 to prevent the eNB timer from expiring (or to stop the eNB timer) after the offload is started. Thus, the eNB timer is prevented from expiring before the UE timer expires without modifying the existing eNB timer.

In the operation pattern 3 according to the second embodiment, the eNB 200 inquires the UE 100 of whether it is possible to release the RRC connection in a case where the release request for the RRC connection is not received from the UE 100 when the eNB timer expires in the eNB 200. Thus, the RRC connection is prevented from being unexpectedly released because even though the eNB timer expires before the UE timer expires, the RRC connection is not released until the approval is gained from the UE 100.

In the operation pattern 4 according to the second embodiment, the eNB 200 controls the eNB timer in order to prevent the eNB timer from expiring before the UE timer expires. Thus, the eNB timer is prevented from expiring before the UE timer expires.

Third Embodiment

Next, a third embodiment will be described.

A case is assumed where the communication state of each of the eNB 200 and the AP 300 is compared by the UE 100 so that the UE 100 itself is capable of selecting the connection target from the eNB 200 and the AP 300.

In this case, the plurality of UEs 100 may select the same AP 300 as a connection target, and may simultaneously start a connection process on the AP 300. Therefore, due to the conflict from the connection process, some UEs 100 may not establish a connection with the AP 300.

Further, even when all of these UEs 100 are capable of establishing a connection with the AP 300, there are problems that as a result of an increase in load level of the AP 300, it is not possible to ensure a sufficient throughput and too many unused resources of the eNB 200 occur.

Thus, an object of the third embodiment is to resolve a problem caused due to simultaneous connection by the plurality of UEs 100 to the AP 300.

Operation According to Third Embodiment

An operation according to the third embodiment will be described.

(1) Operation Environment

Figure 13:
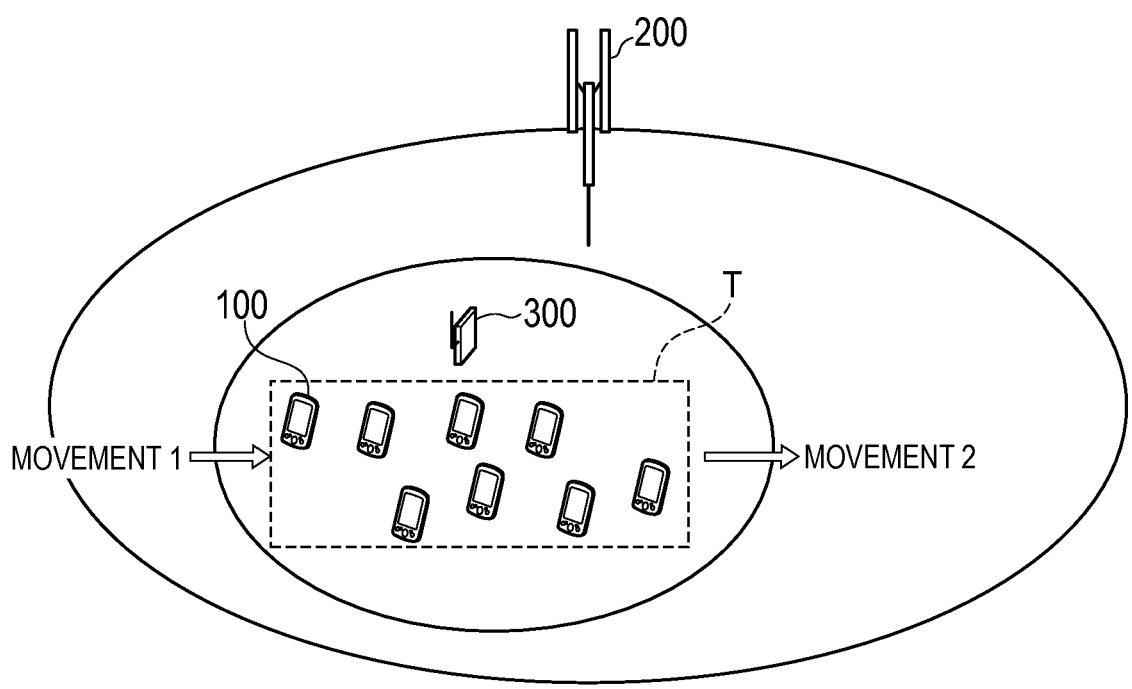
FIG. 13 is a diagram for describing an operation environment according to a third embodiment and a fourth embodiment.

FIG. 13 is a diagram for describing an operation environment according to the third embodiment.

As shown in FIG. 13, there are a plurality of UEs 100 in a coverage of the eNB 200 and in a transport T such as a train or a bus. The transport T moves along a predetermined route (a railway or a road).

The UE 100 has established a connection with the eNB 200, and performs cellular communication with the eNB 200. Specifically, the UE 100 transmits and receives a cellular radio signal including a traffic (user data) with the eNB 200. Alternatively, some UEs 100 may not establish a connection with the eNB 200.

Further, the AP 300 is provided in a coverage of the eNB 200. The AP 300 is an AP (Operator controlled AP) managed by an operator. Specifically, the AP 300 is provided at a stop point (a station or a stop, etc.) at which the transport T stops.

It is noted that in the third embodiment, a case is assumed where the communication state of each of the eNB 200 and the AP 300 is compared by the UE 100 so that the UE 100 itself is capable of selecting the connection target from the eNB 200 and the AP 300.

In such an operation environment, when the transport T moves into the coverage of the AP 300 (movement 1), the plurality of UEs 100 in the transport T start a connection process to the AP 300. The UE 100 that has established the connection with the AP 300 releases the connection with the eNB 200.

Further, the transport T moves out of the coverage of the AP 300 (movement 2) after stopping at the stop point. At that time, the plurality of UEs 100 in the transport T release the connection with the AP 300 and establish the connection with the eNB 200.

Thus, in an operation environment where the AP 300 is provided at the stop point (a station or a stop, etc.) at which the transport T stops, when the UE 100 itself is capable of selecting the connection target from the eNB 200 and the AP 300, there may occur an ineffective operation in which the UE 100 switches the connection from the eNB 200 to the AP 300, and thereafter, the UE 100 switches the connection from the AP 300 to the eNB 200. Further, when the plurality of UEs 100 simultaneously perform the connection process, there may be a conflict from the connection process.

An operation for resolving such a problem will be described, below.

(2) UE Operation Flow

Figure 14:
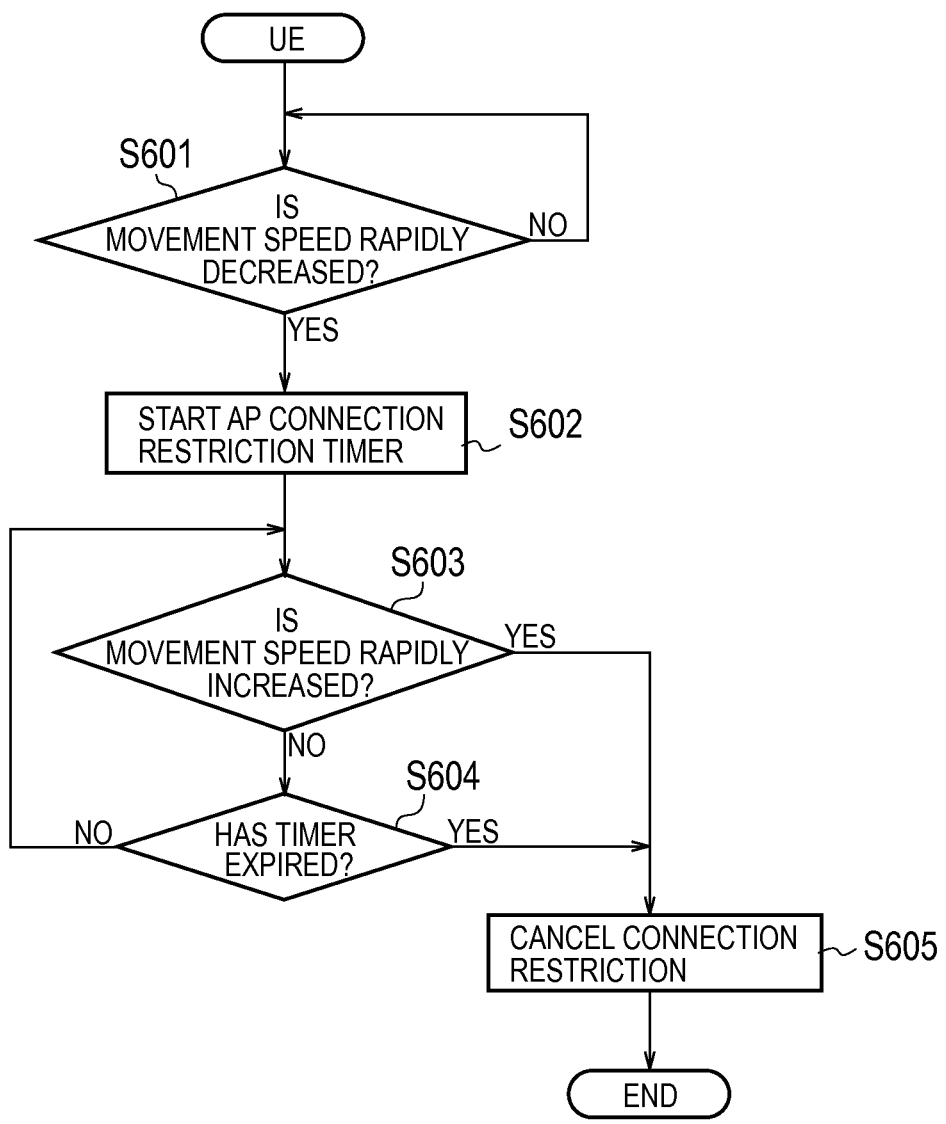
FIG. 14 is an operation flow diagram of a UE 100 according to the third embodiment.

FIG. 14 is an operation flow diagram of the UE 100 according to the third embodiment. Here, a case is assumed where the WLAN communication unit 112 of the UE 100 is in an on state. In the third embodiment, when the WLAN communication unit 112 is in an on state, the processor 160 of the UE 100 measures a movement speed (hereinafter, "UE movement speed") of the UE 100, on the basis of the location information evaluated from the GNSS receiver 130, for example. It is noted that when an acceleration sensor is provided in the UE 100, the UE movement speed (acceleration) may be measured by the acceleration sensor.

As shown in FIG. 14, in step S601, the processor 160 determines whether or not the UE movement speed rapidly decreases. The "UE movement speed rapidly decreasing" means that an amount of decrease in UE movement speed per unit time exceeds a constant amount.

It is noted that the processor 160 executes a process in step S601 when it is detected that the UE movement speed is high speed, and otherwise, may not execute the process in step S601. This is because the UE 100 being located in the transport T is a prerequisite of step S601.

When the UE movement speed rapidly decreases (step S601: Yes), in step S602, the processor 160 activates a timer that regulates a period of an AP connection restriction in which the connection by the WLAN communication unit 112 with the AP 300 is restricted (hereinafter, "AP connection restriction timer"). It is noted that the period of an AP connection restriction (that is, a timer value of the AP connection restriction timer) may be previously stored in the memory 150, and may be designated by the eNB 200 to the UE 100.

In the period of an AP connection restriction, the processor 160 switches the WLAN communication unit 112 to an off state. Alternatively, the processor 160 may cancel decoding the beacon signal of the AP 300 or transmitting to the AP 300 while maintaining the WLAN communication unit 112 in an on state.

In step S603, the processor 160 determines whether or not the UE movement speed rapidly increases. The "UE movement speed rapidly increasing" means that an amount of increase in UE movement speed per unit time exceeds a constant amount.

When the UE movement speed rapidly increases (step S603: Yes), in step S605, the processor 160 cancels the AP connection restriction. That is, it is made possible to connect with the AP 300.

On the other hand, when the UE movement speed does not rapidly increase (step S603: No), in step S604, the processor 160 confirms whether or not the AP connection restriction timer expires. When the AP connection restriction timer expires (step S604: Yes), in step S605, the processor 160 cancels the AP connection restriction. On the other hand, when the AP connection restriction timer does not expire (step S604: No), the processor 160 returns the process to step S603.

Summary of Third Embodiment

The UE 100 according to the third embodiment measures the UE movement speed when the WLAN communication unit 112 is in an on state. Upon detection of a rapid decrease in UE movement speed, the UE 100 restricts the start of connection by the WLAN communication unit 112 with the AP 300. As a result, in an operation environment as shown in FIG. 13, it is possible to avoid an ineffective operation in which the UE 100 switches the communication from the eNB 200 to the AP 300, thereafter, the UE 100 switches the connection from the AP 300 to the eNB 200. Further, it is possible to avoid the conflict from the connection process caused when the plurality of UEs 100 simultaneously perform the connection process.

In the third embodiment, when detecting a rapid increase in UE movement speed after detecting a rapid decrease in UE movement speed, the UE 100 cancels the restriction of a start of connection by the WLAN communication unit 112 with the AP 300. As a result, it is possible to return to a normal operation from a state of the AP connection restriction.

Modification of Third Embodiment

Figure 15:
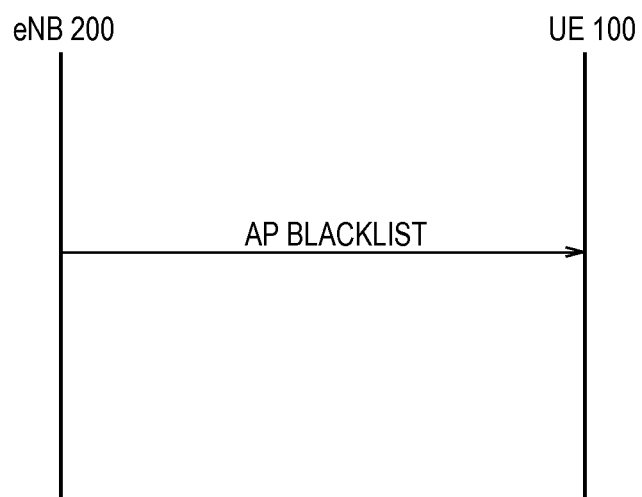
FIG. 15 is a sequence diagram according to a modification of the third embodiment and a modification of the fourth embodiment.

FIG. 15 is a sequence diagram according to a modification of the third embodiment.

As shown in FIG. 15, the processor 240 of the eNB 200 transmits, to the UE 100, a list of APs 300 that should be subject to a connection restriction (hereinafter, "AP blacklist"). The AP blacklist includes an identifier of the AP 300 provided at a stop point (a station or a stop, etc.) at which the transport T stops, for example. The identifier of the AP 300 (AP identifier) is an SSID (Service Set Identifier) or a BSSID (Basic Service Set Identifier).

From a viewpoint of a usage efficiency of a radio resource, the processor 240 may transmit the AP blacklist to the UE 100 by broadcast. Further, the processor 240 may periodically transmit the AP blacklist. Alternatively, the eNB 200 may receive, from the UE 100, information indicating whether the WLAN communication unit 112 is in an on state, and may transmit the AP blacklist by unicast to the UE 100 in which the WLAN communication unit 112 is in an on state.

The cellular communication unit 111 of the UE 100 receives the AP blacklist from the eNB 200. The memory 150 stores the AP blacklist. When an AP identifier included in the beacon signal received by the WLAN communication unit 112 from the AP 300 matches an AP identifier in the AP blacklist, the processor 160 restricts the start of connection with the AP 300.

However, it is necessary that such a method is not applied to the UE 100 other than the UE 100 located in the transport T. Therefore, the processor 160 may enable the AP blacklist in the memory 150 when detecting that the UE movement speed rapidly decreases, and otherwise, disable the AP blacklist.

Alternatively, when an AP identifier included in the beacon signal received by the WLAN communication unit 112 from the AP 300 matches an AP identifier in the AP blacklist, the processor 160 restricts a start of connection with the AP 300 during a constant period, and after the constant period passes, may cancel the connection restriction. Such a constant period may be regulated on the basis of an average time period during which the transport T stops at the stop point (a station or a stop, etc.).

Fourth Embodiment

Description about a fourth embodiment proceeds with a focus on a difference from the above-described third embodiment.

In the fourth embodiment, an operation flow of the UE 100 is different from that in the third embodiment. It is noted that a system configuration and an operation environment in the fourth embodiment are in much the same way as in the third embodiment.

Figure 16:
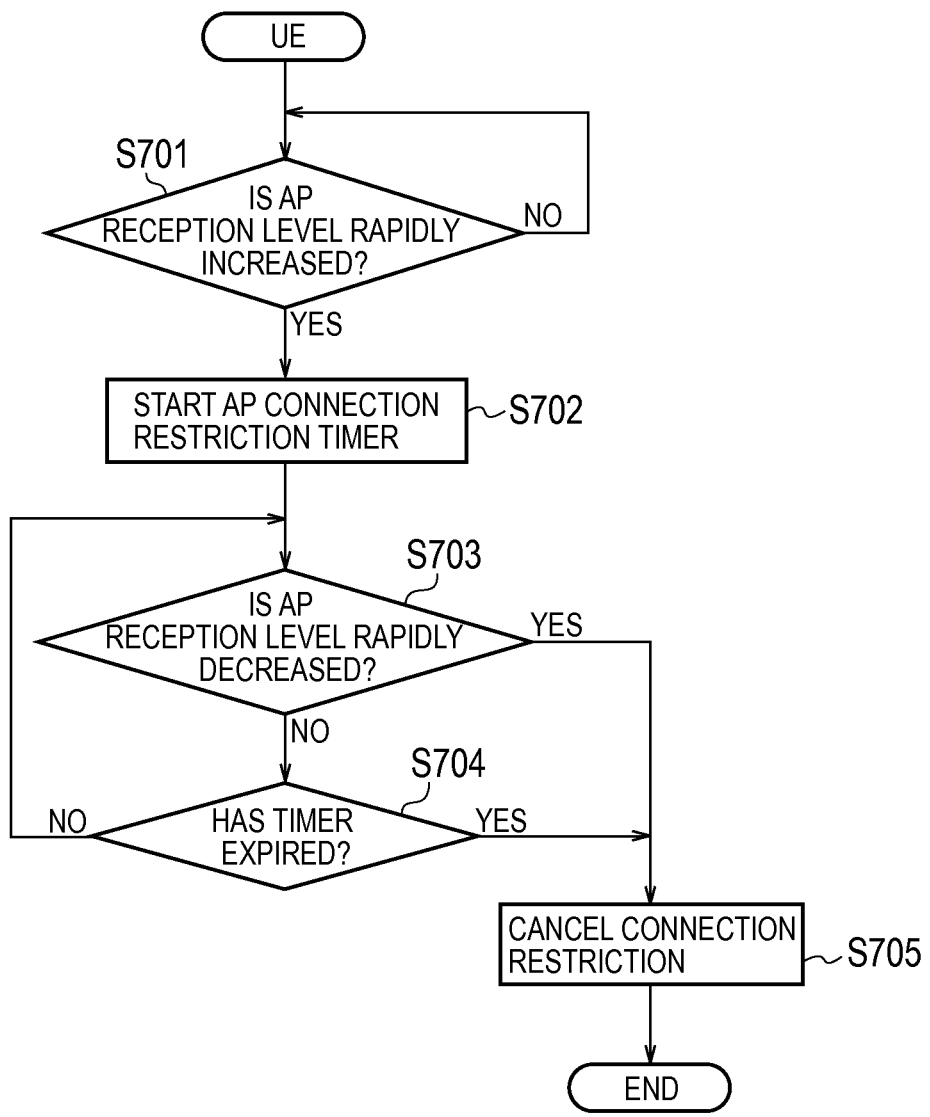
FIG. 16 is an operation flow diagram of the UE 100 according to the fourth embodiment.

FIG. 16 is an operation flow diagram of the UE 100 according to the fourth embodiment. Here, a case is assumed where the WLAN communication unit 112 of the UE 100 is in an on state. In the fourth embodiment, when the WLAN communication unit 112 is in an on state, the processor 160 of the UE 100 measures the reception level of the beacon signal received by the WLAN communication unit 112 from the AP 300 (hereinafter, "AP reception level").

As shown in FIG. 16, in step S701, the processor 160 determines whether or not the AP reception level rapidly increases. The "AP reception level rapidly increasing" means that an amount of increase in AP reception level per unit time exceeds a constant amount.

When the AP reception level rapidly increases (step S701: Yes), in step S702, the processor 160 activates the AP connection restriction timer. As described above, the period of an AP connection restriction (that is, a timer value of the AP connection restriction timer) may be previously stored in the memory 150, and may be designated by the eNB 200 to the UE 100.

In the fourth embodiment, in the period of an AP connection restriction, the processor 160 may cancel decoding the beacon signal of the AP 300 or transmitting the beacon signal to the AP 300 while maintaining the WLAN communication unit 112 in an on state. That is, although it is not possible to connect with the AP 300, it is made possible to measure the AP reception level.

In step S703, the processor 160 determines whether or not the AP reception level rapidly decreases. The "AP reception level rapidly decreasing" means that an amount of decrease in AP reception level per unit time exceeds a constant amount.

When the AP reception level rapidly decreases (step S703: Yes), in step S705, the processor 160 cancels the AP connection restriction. That is, it is made possible to connect with the AP 300.

On the other hand, when the AP reception level does not rapidly decrease (step S703: No), in step S704, the processor 160 confirms whether or not the AP connection restriction timer expires. When the AP connection restriction timer expires (step S704: Yes), in step S705, the processor 160 cancels the AP connection restriction. On the other hand, when the AP connection restriction timer does not expire (step S704: No), the processor 160 returns the process to step S703.

Summary of Fourth Embodiment

The UE 100 according to the fourth embodiment measures the AP reception level when the WLAN communication unit 112 is in an on state. When detecting a rapid increase in AP reception level, the UE 100 restricts the start of connection by the WLAN communication unit 112 with the AP 300. As a result, in an operation environment as shown in FIG. 13, it is possible to avoid an ineffective operation in which the UE 100 switches the communication from the eNB 200 to the AP 300, thereafter, the UE 100 switches the connection from the AP 300 to the eNB 200. Further, it is possible to avoid the conflict from the connection process caused when the plurality of UEs 100 simultaneously perform the connection process.

In the fourth embodiment, when detecting a rapid decrease in AP reception level after detecting a rapid increase in AP reception level, the UE 100 cancels the restriction of a start of connection by the WLAN communication unit 112 with the AP 300. As a result, it is possible to return to a normal operation from a state of the AP connection restriction.

Modification of Fourth Embodiment

In the fourth embodiment also, the AP blacklist may be applied in much the same way as in the above-described third embodiment. However, it is necessary that the AP blacklist is not applied to the UE 100 other than the UE 100 located in the transport T. Therefore, when detecting a rapid increase in AP reception level, the processor 160 may enable the AP blacklist in the memory 150, and otherwise, disable the AP blacklist.

Alternatively, as described above, when an AP identifier included in the beacon signal received by the WLAN communication unit 112 from the AP 300 matches an AP identifier in the AP blacklist, the processor 160 restricts the start of connection with the AP 300 during a constant period, and after the constant period passes, may cancel the connection restriction.

Fifth Embodiment

Next, a fifth embodiment will be described.

Generally, the UE 100 performs a WLAN scan in order to discover a connectable AP 300. The WLAN scan is an operation in which reception of a WLAN radio signal (for example, a beacon signal) is attempted by the WLAN communication unit 112 for each WLAN channel.

The UE 100 continues the WLAN scan while switching the WLAN channels until it is completed to attempt all the WLAN channels or until it is successful to receive the WLAN radio signal. Thus, the power consumption of the UE 100 (in particular, the power consumption of the WLAN communication unit 112) increases.

Therefore, there is a problem that in an offload, the power consumption of the UE 100 increases resulting from the WLAN scan.

Therefore, an object of the fifth embodiment is to enable realization of an offload of the eNB 200 while restraining an increase in power consumption resulting from the WLAN scan.

(System Configuration)

Figure 17:
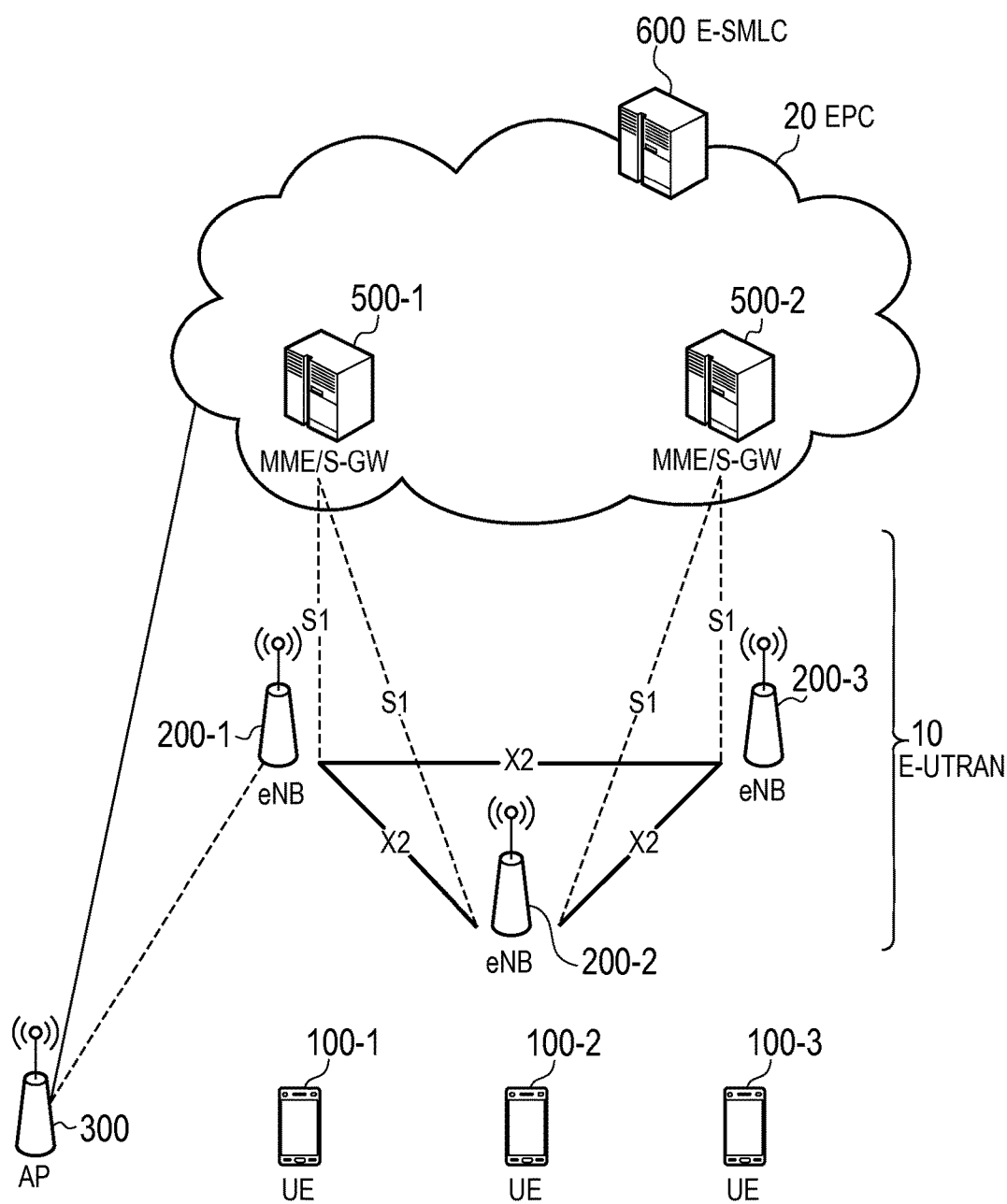
FIG. 17 is a system configuration diagram according to a fifth embodiment.

FIG. 17 is a system configuration diagram according to the fifth embodiment.

As shown in FIG. 17, the EPC 20 includes an E-SMLC (Evolved Serving Mobile Location Centre) 600 that is a serve device that provides location information indicating a geographical location of the UE 100. The E-SMLC 600 collects a result of a radio measurement in the UE 100 and/or the eNB 200 to calculate location information indicating a geographical location of the UE 100. For details of a mechanism for calculating the location information, refer to 3GPP technical specification "TS 36.305".

Operation According to Fifth Embodiment

Next, an operation according to the fifth embodiment will be described.

(1) Operation Environment

Figure 18:
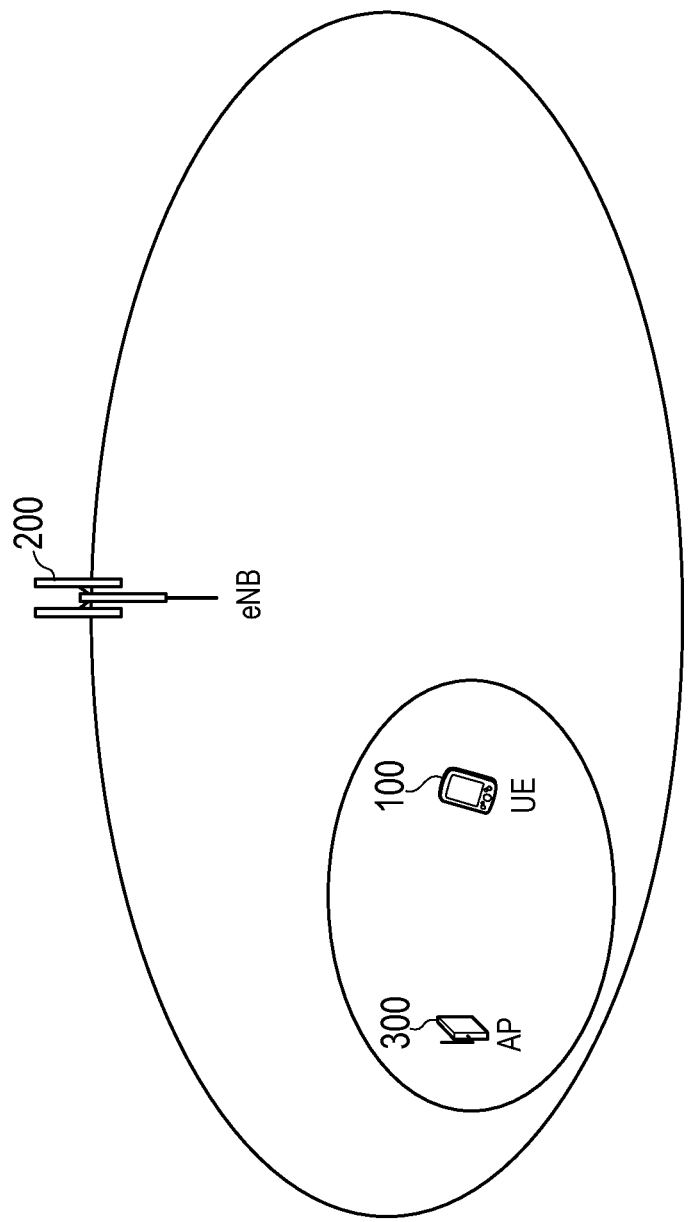
FIG. 18 is a diagram for describing an operation environment according to the fifth embodiment.

FIG. 18 is a diagram for describing an operation environment according to the fifth embodiment. As shown in FIG. 18, the AP 300 is provided in a coverage of the eNB 200. The AP 300 is an AP (Operator controlled AP) managed by an operator.

Further, the UE 100 is located in the coverage of the eNB 200 and in the coverage of the AP 300. The UE 100 has established a connection with the eNB 200, and performs cellular communication with the eNB 200. Specifically, the UE 100 transmits and receives a cellular radio signal including a traffic (user data) with the eNB 200. It is noted that in FIG. 18, there shows only one UE 100 that have established the connection with the eNB 200; in a real environment, a large number of UEs 100 may have established the connection with the eNB 200.

When the eNB 200 establishes a connection with a large number of UEs 100, a load level of the eNB 200 increases. The "load level" means the degree of congestion in the eNB 200 such as a traffic load of the eNB 200 or usage of radio resources of the eNB 200. Here, at least a part of traffic transmitted and received between the UE 100 and the eNB 200 is allowed to transfer to the WLAN system, so that it is possible to disperse a traffic load of the eNB 200, in the WLAN system.

Description will be provided for an operation for transferring (offloading) the traffic transmitted and received between the UE 100 and the eNB 200, to the WLAN system below. It is noted that the offload includes not only a case where all the traffics transmitted and received between the UE 100 and the eNB 200 are transferred to the WLAN system but also a case where at least a part of the traffic is transferred to the WLAN system while maintaining a connection between the UE 100 and the eNB 200.

(2) WLAN Scan

Prior to description of the offload operation, a general WLAN scan will be described.

The UE 100 performs a WLAN scan in order to discover a connectable AP 300. The WLAN scan is an operation in which reception of a WLAN radio signal from the AP 300 is attempted by the WLAN communication unit 112 for each WLAN channel. The WLAN scan includes a passive scan scheme and an active scan scheme; in the fifth embodiment, either scheme may be selected.

The passive scan scheme is a scheme in which the UE 100 attempts to receive the beacon signal periodically transmitted in the WLAN channel employed by the AP 300. The beacon signal includes information on the AP 300, such as an identifier of the AP 300. The identifier of the AP 300 is an SSID (Service Set Identifier) or a BSSID (Basic Service Set Identifier). The UE 100 attempts to receive the beacon signal over a predetermined time equal to or longer than a transmission period of the beacon signal, for each WLAN channel. When a predetermined time passes or when it is not successful to receive the beacon signal within a predetermined time, the UE 100 switches to a next WLAN channel, and then, attempts to receive the beacon signal again.

The active scan scheme is a scheme in which the UE 100 transmits a probe request in the WLAN channel, the AP 300 that is employing the WLAN channel transmits a probe response in response to the probe request, and the UE 100 attempts to receive the probe response. Information included in the probe response is similar to the information included in the beacon signal. Therefore, it is possible to regard the probe response as one type of the beacon signal. The UE 100 attempts to receive the probe response over a predetermined time since transmitting the probe request, for each WLAN channel. When a predetermined time passes or when it is not successful to receive the probe response within a predetermined time, the UE 100 switches to a next WLAN channel, and transmits the probe request again, and then, attempts to receive the probe response.

Thus, the UE 100 continues the WLAN scan while switching the WLAN channels until it is successful to receive at least the beacon signal (or the probe response), and thus, the power consumption of the UE 100 (in particular, the power consumption of the WLAN communication unit 112) increases. Therefore, in the offload operation according to the fifth embodiment, when the WLAN scan is made efficient, the power consumption in the WLAN scan is reduced.

(3) Offload Operation

Figure 19:
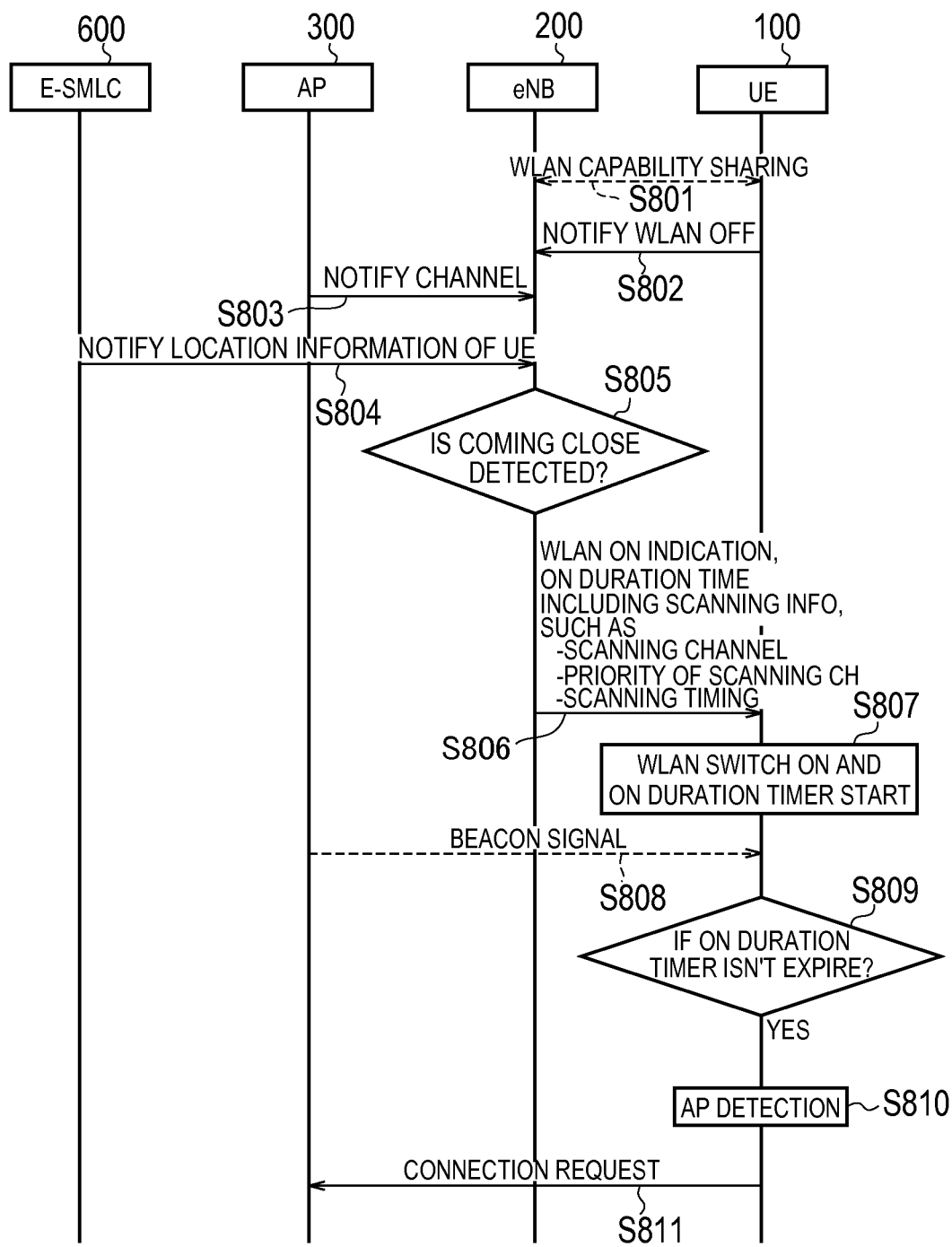
FIG. 19 is a sequence diagram of an offload operation according to the fifth embodiment.

FIG. 19 is a sequence diagram of the offload operation according to the fifth embodiment. In an initial state of the present sequence, the UE 100 has established the connection with the eNB 200, and brings the WLAN communication unit 112 into an off state (a state where it is not possible to transmit and receive the WLAN radio signal). Further, it is assumed that the load level of the eNB 200 is high and a preferable situation is realized to perform the offload, for example.

As shown in FIG. 19, in step S801, the processor 160 of the UE 100 notifies the eNB 200 by the cellular communication unit 111 of information indicating a WLAN communication capability (hereinafter, "WLAN capability information") of the UE 100. The WLAN capability information is information indicating whether or not the UE 100 supports the WLAN communication. When the UE 100 supports the WLAN communication, the WLAN capability information may include information indicating a function of the supported WLAN communication (hereinafter, "WLAN function information"). Examples of the function of the supported WLAN communication include a standard of the supported WLAN communication (IEEE 802.11a/b/g/n), a supported QoS function (WMM: Wi-Fi MultiMedia, etc.), and a support WLAN frequency band (2.4 GHz band, 5 GHz band, etc.).

It is noted that the UE 100 may autonomously notify the eNB 200 of the WLAN capability information during connection with the eNB 200, and may notify the eNB 200 of the WLAN capability information in response to a request from the eNB 200 after connection with the eNB 200.

When the cellular communication unit 210 receives the WLAN capability information, the processor 240 of the eNB 200 determines, on the basis of the received WLAN capability information, whether or not the UE 100 is an offloadable UE 100 (that is, the UE 100 that supports the WLAN communication). Further, the processor 240 may determine that the UE 100 is not possible to offload when there is no AP 300 that matches the WLAN function information, out of the APs 300 in the coverage of the eNB 200. In this case, description is provided on the assumption that it is determined that the UE 100 is possible to offload.

In step S802, the processor 160 of the UE 100 notifies the eNB 200, by the cellular communication unit 111, of information indicating that the WLAN communication unit 112 is in an off state (hereinafter, "WLAN off information"). The processor 160 may notify the eNB 200 of the WLAN off information when bringing the WLAN communication unit 112 into an off state, and may notify the eNB 200 of the WLAN off information in response to an inquiry from the eNB 200. Alternatively, the processor 160 may periodically notify the eNB 200 whether the WLAN communication unit 112 is in an off state or an on state.

In step S803, the processor 240 of the eNB 200 acquires information indicating an operation status of the AP 300 (hereinafter, "AP operation information"), by the network interface 220, from the AP 300. The AP operation information includes information indicating a WLAN channel operating in the AP 300 and information indicating a WLAN frequency band including the WLAN channel. Further, the AP operation information may include information indicating a timing (period) at which the AP 300 transmits the beacon signal. The AP 300 may periodically notify the eNB 200 of the AP operation information, and may notify the eNB 200 of the AP operation information in response to a request from the eNB 200. The notification may be performed by way of a core network.

In step S804, the processor 240 of the eNB 200 acquires information indicating a geographical location of the UE 100 (hereinafter, "UE location information"), by the network interface 220, from the E-SMLC 600. Alternatively, when the UE 100 has the GNSS receiver 130 and the GNSS receiver 130 is in an on state, the processor 240 may acquire, by the cellular communication unit 111, the UE location information generated by using the GNSS receiver 130, from the UE 100.

It is noted that step S801 to step S804 may be performed in any order as well as in this order.

In step S805, the processor 240 of the eNB 200 compares the UE location information and information indicating a geographical location of the AP 300 (hereinafter, "AP location information") to determine whether or not the UE 100 comes close to the AP 300. Specifically, the processor 240 determines whether or not the UE 100 is located in the coverage of the AP 300. It is noted that the AP location information may be previously stored in the memory 230 of the eNB 200 and may be notified to the eNB 200 from the AP 300. In this case, description is provided on the assumption that it is determined that the UE 100 comes close to the AP 300.

The processor 240 of the eNB 200 determines the UE 100 as the UE 100 subject to offload because the UE 100 that supports the WLAN communication brings the WLAN communication unit 112 in an off state and comes close to the AP 300. Then, the processor 240 generates scan control information for controlling the WLAN scan by the UE 100, on the basis of the AP operation information. It is noted that when the scan control information is generated, the WLAN capability information, in addition to the AP operation information, may be taken into consideration.

The scan control information includes at least one of information on a scan frequency and information on a scan time. Further, the scan control information may include information on a priority (priority information).

The information on the scan frequency includes channel information for designating a WLAN channel subject to the WLAN scan or a WLAN channel not subject to the WLAN scan. The WLAN channel subject to the WLAN scan is a WLAN channel operating in the AP 300 near the UE 100. The WLAN channel not subject to the WLAN scan is a WLAN channel not operating in the AP 300 near the UE 100.

Further, the information on the scan frequency includes frequency band information for designating a WLAN frequency band subject to the WLAN scan or a WLAN frequency band not subject to the WLAN scan. The WLAN frequency band subject to the WLAN scan is a WLAN frequency band operating in the AP 300 near the UE 100. The WLAN frequency band not subject to the WLAN scan is a WLAN frequency band not operating in the AP 300 near the UE 100.

The priority information is information for designating a WLAN channel and/or a WLAN frequency band where reception of the WLAN radio signal (beacon signal, etc.) should be preferentially attempted in the WLAN scan. It is preferable to set the priority information so that the WLAN channel operating in the AP 300 near the UE 100 and/or the operating WLAN frequency band is preferentially scanned.

The information on the scan time includes period information for designating a period during which the WLAN scan should be continued (that is, a period during which the WLAN should be maintained in an on state).

Further, the information on the scan time includes timing information for designating a timing at which the WLAN scan should be performed. The timing information preferably is information indicating a timing (period) at which the AP 300 near the UE 100 transmits the beacon signal.

In step S806, the processor 240 of the eNB 200 transmits, by the cellular communication unit 210, a WLAN on request for switching the WLAN communication unit 112 to an on state, to the UE 100. The processor 240 transmits the scan control information to be included in the WLAN on request. The cellular communication unit 111 of the UE 100 receives the WLAN on request.

In step S807, the processor 160 of the UE 100 switches the WLAN communication unit 112 to an on state, in response to reception of the WLAN on request. Then, after switching the WLAN communication unit 112 to an on state, the processor 160 controls the WLAN scan in accordance with the scan control information included in the WLAN on request.

Specifically, the processor 160 performs the WLAN scan only on the WLAN channel subject to the WLAN scan, on the basis of the channel information, and performs the WLAN scan only on the WLAN frequency band subject to the WLAN scan, on the basis of the frequency band information. Further, on the basis of the priority information, the processor 160 preferentially attempts to receive the WLAN radio signal (beacon signal, etc.) in a WLAN channel and/or a WLAN frequency band having a high priority. Further, the processor 160 activates a timer for timing a period during which the WLAN scan should be continued, on the basis of the period information. The processor 160 performs the WLAN scan only at a timing at which the WLAN scan should be performed, on the basis of the timing information. It is noted that when there is no period information, the processor 160 may scan only once (one shot scan) by using reception of the WLAN on request as a trigger.

It is noted that even when the processor 160 switches the WLAN communication unit 112 to an on state in response to the WLAN on request, it is preferable for the processor 160 not to display the switching on the user interface 120. This is to prevent a user from recognizing that an automatic WLAN on is a malfunction, which is different from a case where a user performs the operation to switch the WLAN communication unit 112 to an on state.

In step S808, the WLAN communication unit 112 of the UE 100 receives the beacon signal from the AP 300. When the WLAN scan is performed in the corresponding WLAN channel and timing, the processor 160 detects the beacon signal from the AP 300 to discover the connectable AP 300.

In step S809, the processor 160 determines whether or not a timer indicating a period during which the WLAN scan should be continued expires. When the timer expires without the connectable AP 300 not being discovered, the processor 160 switches the WLAN communication unit 112 to an off state. Here, description is provided on the assumption that the connectable AP 300 is discovered during the timer running (step S810).

In step S811, the processor 160 of the UE 100 transmits a connection request to the AP 300, by the WLAN communication unit 112, to the AP 300. As a result, the connection between the UE 100 and the AP 300 is established.

Summary of Fifth Embodiment

The eNB 200 according to the fifth embodiment transmits the WLAN on request to the UE 100. The WLAN on request includes the scan control information for controlling the WLAN scan. After switching the WLAN communication unit 112 to an on state in response to reception of the WLAN on request, the UE 100 controls the WLAN scan in accordance with the scan control information included in the WLAN on request. Therefore, when the WLAN communication unit 112 is switched by the eNB 200 to an on state, it is possible to establish a state where it is possible to offload the eNB 200. Further, it is possible to efficiently perform the WLAN scan in accordance with the scan control information from the eNB 200, and thus, the UE 100 is capable of reducing the power consumption in the WLAN scan.

In the fifth embodiment, the eNB 200 acquires at least one of the UE location information indicating the geographical location of the UE 100 and the AP operation information indicating the operation status of the AP 300. Then, the eNB 200 controls to transmit the WLAN on request on the basis of the acquired information. As a result, the eNB 200 is capable of appropriately determining whether or not to transmit the WLAN on request to the UE 100. Further, it is possible to appropriately set a content of the scan control information to be included in the WLAN on request.

In the fifth embodiment, prior to reception of the WLAN on request, the UE 100 notifies the eNB 200 of at least one of the WLAN capability information indicating the WLAN communication capability of the UE 100 and the WLAN off information indicating that the WLAN communication unit 112 is in an off state. The eNB 200 controls to transmit the WLAN on request on the basis of the information received from the UE 100. As a result, the eNB 200 is capable of appropriately determining whether or not to transmit the WLAN on request to the UE 100.

In the fifth embodiment, the scan control information includes at least one of the channel information for designating a WLAN channel subject to the WLAN scan or a WLAN channel not subject to the WLAN scan, and the frequency band information for designating a WLAN frequency band subject to the WLAN scan or a WLAN frequency band not subject to the WLAN scan. As a result, the UE 100 is capable of limiting the WLAN channel and/or the WLAN frequency band subject to the WLAN scan, and thus, it is possible to reduce the power consumption in the WLAN scan.

In the fifth embodiment, the scan control information includes the priority information for designating a WLAN channel and/or a WLAN frequency band where reception of the WLAN radio signal should be preferentially attempted in the WLAN scan. As a result, in the WLAN scan, the UE 100 is capable of discovering early the available WLAN channel, and thus, it is possible to reduce the power consumption in the WLAN scan.

In the fifth embodiment, the scan control information includes at least one of the period information for designating a period during which the WLAN scan should be continued, and the timing information for designating a timing at which the WLAN scan should be performed. As a result, the UE 100 is capable of limiting the period during which and/or the timing at which the WLAN scan is performed, and thus, it is possible to reduce the power consumption in the WLAN scan.

First Modification of Fifth Embodiment

Description is provided with a case where in the above-described operation sequence, the WLAN communication unit 112 of the UE 100 is in an off state, and the WLAN off information to that effect is notified from the UE 100 to the eNB 200. However, the eNB 200 may transmit the WLAN on request to the UE 100 irrespective of the WLAN off information. When the WLAN communication unit 112 is in an on state and the WLAN on request is received from the eNB 200, the processor 160 of the UE 100 ignores the WLAN on request.

Further, description is provided with a case where in the above-described operation sequence, the UE 100 supports the WLAN communication and the WLAN capability information to that effect is notified from the UE 100 to the eNB 200. However, the eNB 200 may transmit the WLAN on request to the UE 100 irrespective of the WLAN capability information. The UE 100 that does not support the WLAN communication ignores the WLAN on request even when the cellular communication unit 111 receives the WLAN on request from the eNB 200.

Second Modification of Fifth Embodiment

Prior to receiving the WLAN on request, the UE 100 may notify the eNB 200 of information on the reception level of the GNSS signal. When the reception level of the GNSS signal is low, it is possible to estimate that the UE 100 is located indoors, and otherwise, it is possible to estimate that the UE 100 is located outdoors. Further, there are some WLAN frequency bands that are prohibited from being used outdoors. Therefore, when it is possible to estimate that the UE 100 is located outdoors, the eNB 200 preferably generates the WLAN frequency band information so that a WLAN frequency band that is prohibited from being used outdoors is not subject to the WLAN scan.

Sixth Embodiment

Next, a sixth embodiment will be described.

A case is assumed where the UE 100 is not connected to a cell managed by the eNB 200 and performs data communication with the AP 300 in a wireless LAN system. In this case, there is a problem that when the UE 100 is off the coverage of the AP 300, data communication is interrupted until the UE 100 is connected to the cell of the eNB 200.

Therefore, an object of the sixth embodiment is to seamlessly transfer from data communication in a wireless LAN system to data communication in a cellular communication system.

(System Configuration)

Figure 20:
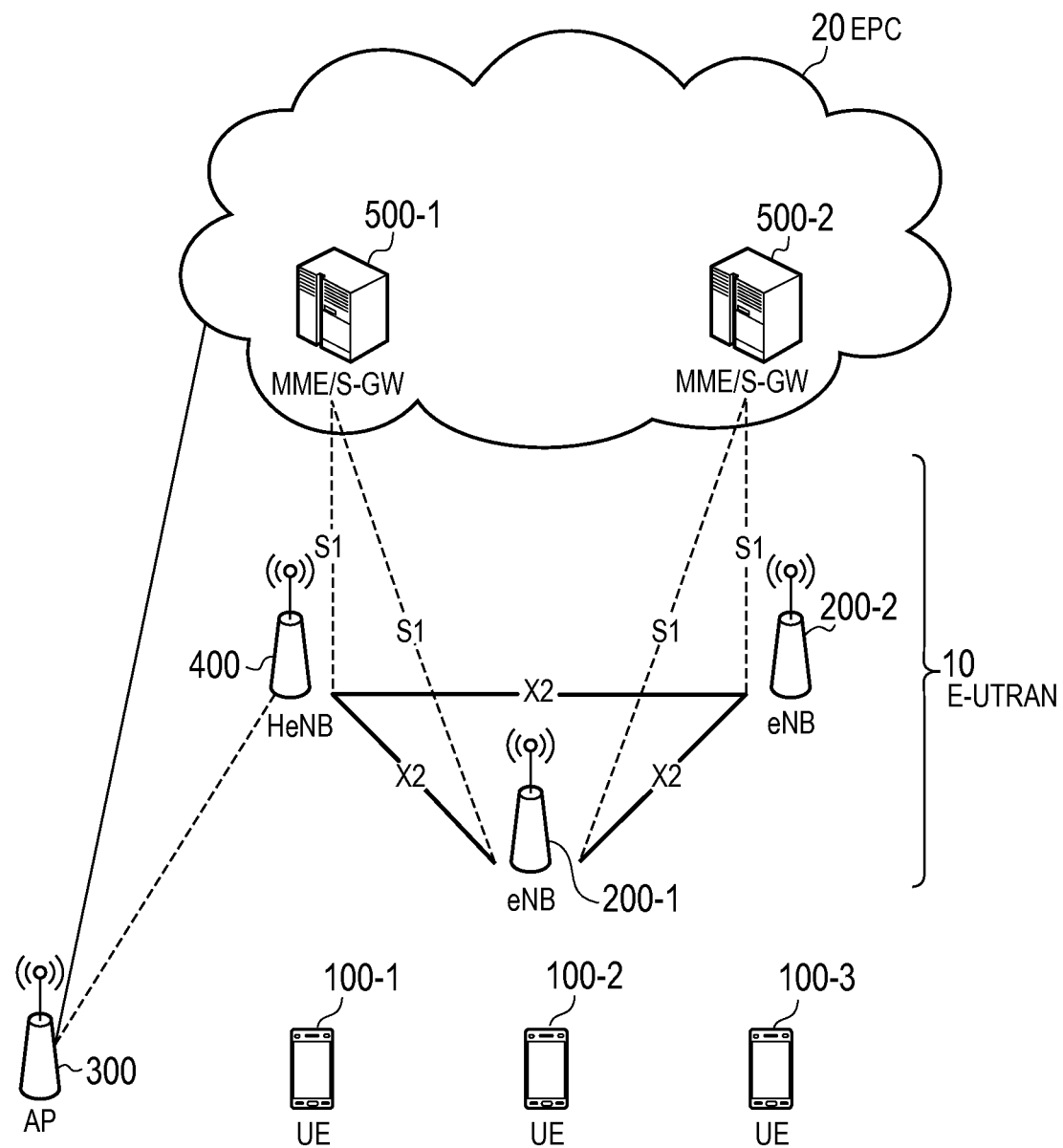
FIG. 20 is a system configuration diagram according to a sixth embodiment and a seventh embodiment.

FIG. 20 is a system configuration diagram according to the sixth embodiment.

As shown in FIG. 20, in the sixth embodiment, the E-UTRAN 10 includes the eNB 200 (evolved Node-B) and a HeNB 400 (Home evolved Node-B). The eNB 200 corresponds to a cellular base station.

Figure 22:
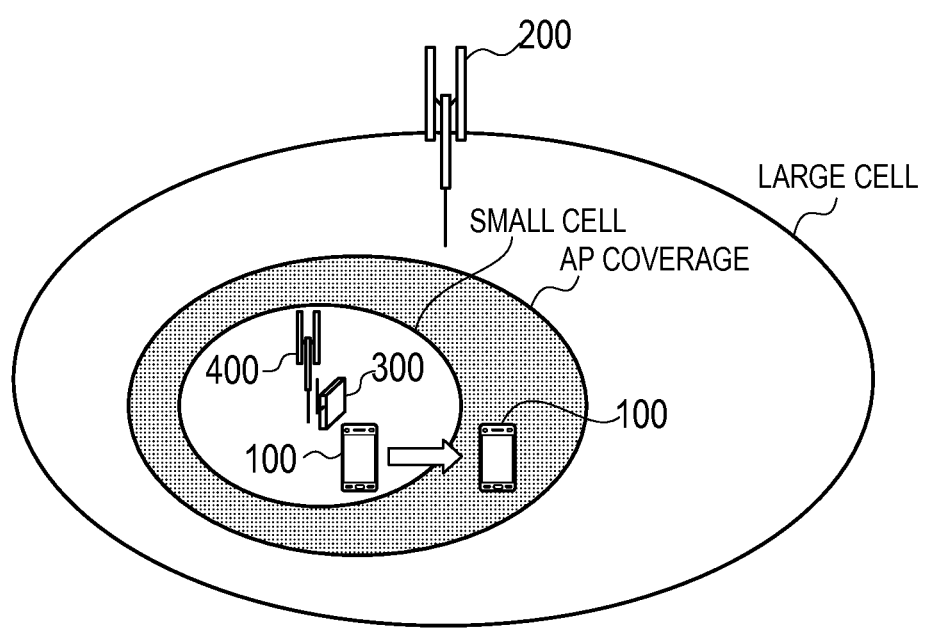
FIG. 22 is a diagram showing a positional relation among the UE 100, an eNB 200, a HeNB 400, and an AP 300 according to the sixth embodiment.

The HeNB 400 manages a specific cell (small cell/femto cell) having a narrower cover range than a cell managed by the eNB 200 (large cell: macro cell) (see FIG. 22). The HeNB performs radio communication with the UE that has established a connection (RRC connection) with the specific cell.

The specific cell is called a "CSG cell", a "hybrid cell", or an "open cell" according to a set access mode.

The CSG cell is a cell accessible only by a UE 100 (called a "member UE") having an access right, and broadcasts a CSG ID. The UE 100 holds a list (whitelist) of a CSG ID of an CSG cell for which the UE 100 has an access right, and determines the presence or absence of access right on the basis of the whitelist and the CSG ID broadcast by the CSG cell.

The hybrid cell is a cell in which the member UE is more advantageously treated as compared with the non-member UE, and broadcasts information indicating that the hybrid cell is a cell released also to the non-member UE, in addition to the CSG ID. The UE 100 determines the presence or absence of access right on the basis of the whitelist and the CSG ID broadcast by the hybrid cell.

The open cell is a cell in which the UE 100 is equivalently treated regardless of whether the UE 100 is a member, and does not broadcast the CSG ID. In view of the UE 100, the open cell is equal to a cell.

It is noted that the MME/S-GW 500 verifies the UE 100 for access right to the CSG cell.

Further, the HeNB 400 and the AP 300 are directly connected to each other through an arbitrary interface of an operator. Therefore, the HeNB 400 has data directly transferred from the AP 300.

The HeNB 400 and the AP 300 may be disposed in the same location (Collocated). That is, the HeNB 400 may be of collocated type. For example, as the HeNB 400 of collocated type, the HeNB 400 and the AP 300 may be of integrated type in which the HeNB 400 and the AP 300 are disposed in the same housing. In this case, the HeNB 400 and the AP 300 may share a controller.

Next, the configuration of the HeNB 400 will be described.

Figure 21:
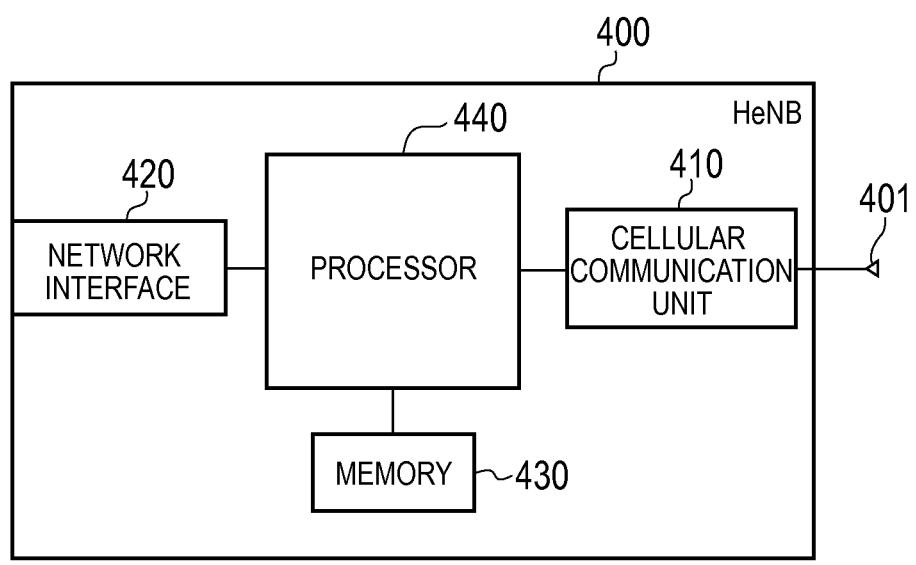
FIG. 21 is a block diagram of a HeNB according to the sixth embodiment and the seventh embodiment.

FIG. 21 is a block diagram of the HeNB 400. As shown in FIG. 21, the HeNB 400 includes an antenna 401, a cellular communication unit 410, a network interface 420, a memory 430, and a processor 440. The memory 430 and the processor 440 configure a controller. It is noted that the memory 430 is integrated with the processor 440, and this set (that is, a chipset) may be a processor configuring a controller.

The antenna 401 and the cellular communication unit 410 are used for transmitting and receiving a cellular radio signal. The cellular communication unit 410 converts a baseband signal output from the processor 440 into the cellular radio signal, and transmits the same from the antenna 401. Further, the cellular communication unit 410 converts the cellular radio signal received by the antenna 401 into the baseband signal, and outputs the same to the processor 440. In the present embodiment, the cellular communication unit 410 forms a CSG cell.

The network interface 420 is connected to the neighboring eNB 200 or the neighboring HeNB 400 via the X2 interface and is connected to the MME/S-GW 500 via the S1 interface. Further, the network interface 420 is connected to the AP 300 via an interface that directly connects the AP 300 and the HeNB 400 (hereinafter, "specific interface" where appropriate). The specific interface is used for communication with the AP 300. For example, user data is transferred via the specific interface from the AP 300.

The memory 430 stores a program to be executed by the processor 440 and information to be used for a process by the processor 440. The processor 440 includes a baseband processor that performs modulation and demodulation, encoding and decoding, etc., on the baseband signal and a CPU that performs various processes by executing the program stored in the memory 430. The processor 440 executes various types of processes and various types of communication protocols described later.

It is noted that in the present embodiment, the network interface 320 in the AP 300 is connected to the HeNB 400 via a specific interface that directly connects the AP 300 and the HeNB 400. The specific interface in the AP 300 is used for communication with the HeNB 400. For example, user data is transferred to the HeNB 400 via the specific interface.

(Collocated AP List)

In the present embodiment, the UE 100 has a collocated AP list. The UE 100 and the eNB 200 share the collocated AP list.

The collocated AP list is of collocated type located at the same place as the AP 300, and includes a cell ID of a small cell managed by the HeNB 400 of collocated type connected directly to the AP 300, and location information of the HeNB 400. The collocated AP list may include information indicating an identifier of the AP 300 connected directly to the HeNB 400.

The UE 100 acquires the collocated AP list from the eNB 200. For example, the UE 100 receives the collocated AP list from the eNB 200, during establishment of a connection, during execution of a handover, or at a timing at which a paging area is changed.

The eNB 200 may transmit the collocated AP list to the UE 100 on the basis of capability information indicating that the UE 100 supports communication methods of both the cellular communication and the WLAN communication.

Operation According to Sixth Embodiment

Figure 23:
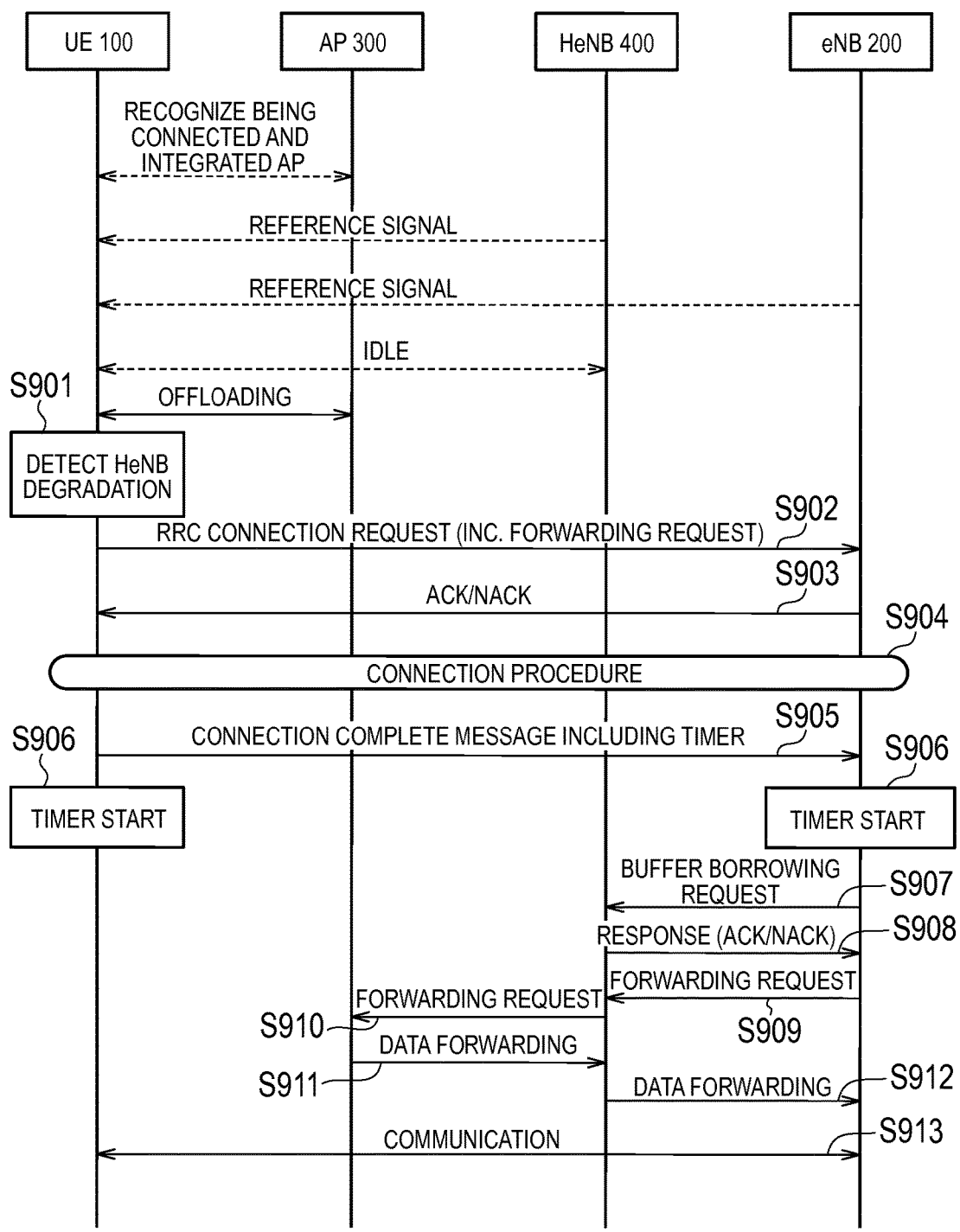
FIG. 23 is a sequence diagram for describing an operation according to the sixth embodiment.
Figure 24:
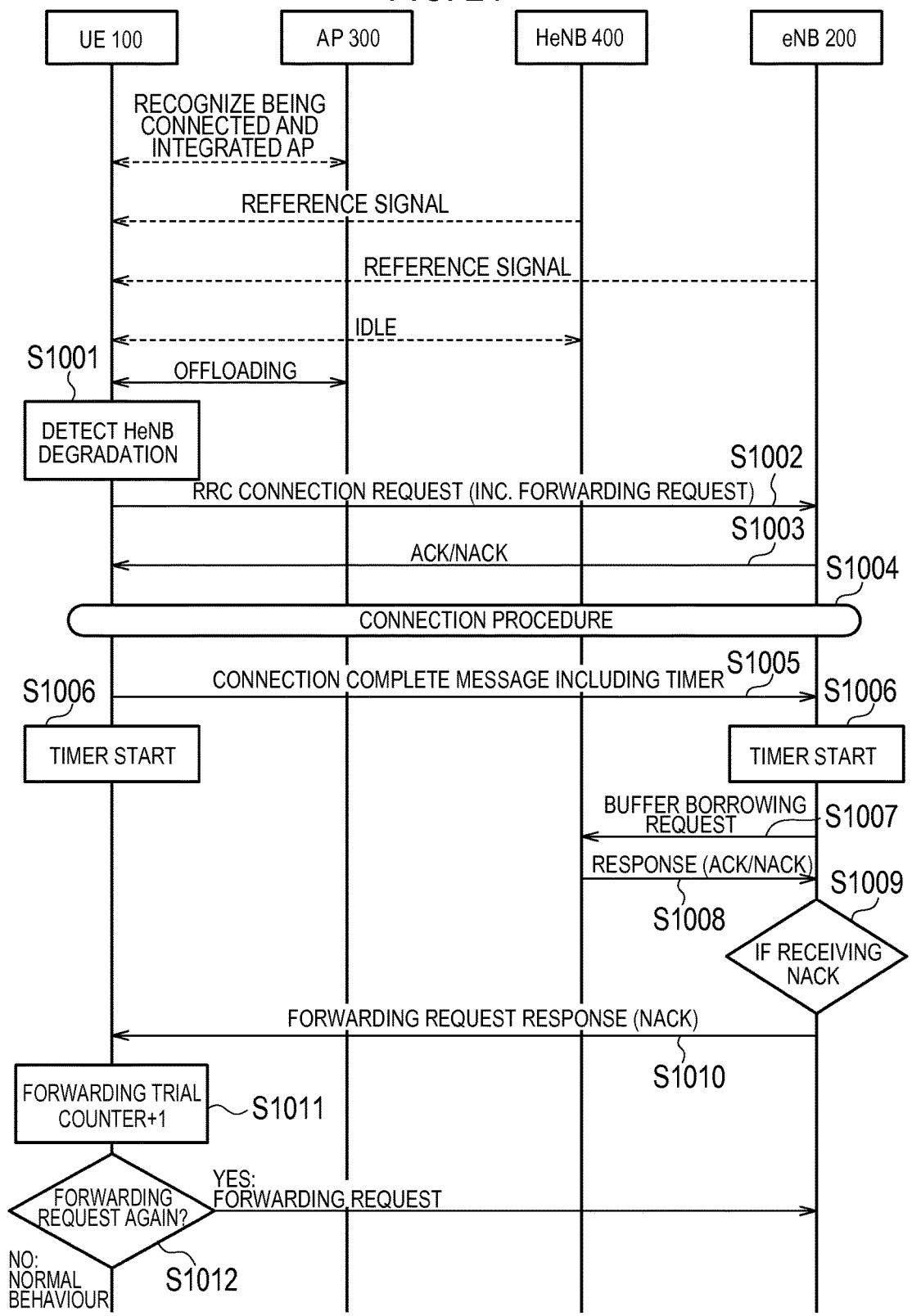
FIG. 24 is a sequence diagram for describing an operation according to the sixth embodiment.

Next, an operation according to the sixth embodiment will be described with reference from FIG. 22 to FIG. 24. FIG. 22 is a diagram showing a positional relation among the UE 100, the eNB 200, the AP 300, and the HeNB 400 according to the sixth embodiment. FIG. 23 and FIG. 24 are a sequence diagram for describing an operation according to the sixth embodiment.

As shown in FIG. 22, the UE 100 exists in a large cell managed by the eNB 200. Further, the HeNB 400 and the AP 300 are disposed in the same location, and the HeNB 400 and the AP 300 are directly connected. Specifically, the AP 300 is an AP (collocated-type AP) integrated with the HeNB 400.

A coverage of a small cell managed by the HeNB 400 and a coverage of the AP 300 at least partially overlap. In the present embodiment, the coverage of the AP 300 and the coverage of the small cell are the same, or the coverage of the AP 300 is larger than the coverage of the small cell. Further, the coverage of the small cell and the coverage of the AP 300 are contained in the coverage of the large cell.

Further, in the present embodiment, description proceeds with an assumption that the UE 100 moves in a direction leaving the HeNB 400 to be off the coverage of the small cell. Further, description proceeds with an assumption that the UE 100 has an access right to the HeNB 400. That is, the UE is a CSG member, and the small cell is a hybrid cell or an open cell.

As shown in FIG. 23, the UE 100 recognizes that the UE 100 is being connected to the AP 300 and the connected AP 300 is an AP 300 integrated with the HeNB 400. For example, when receiving from the AP 300 that the AP 300 is of integrated type or receiving broadcast information from the HeNB 400 that the AP 300 is of integrated type, the UE 100 recognizes that the AP 300 is of integrated type. Alternatively, the UE 100 may recognize that the connected AP 300 is an integrated-type AP 300 on the basis of the collocated AP list. Specifically, the UE 100 recognizes that the connected AP 300 is the integrated-type AP 300 when an identifier of the connected AP 300 and an identifier of the AP 300 included in the collocated AP list match.

Further, as shown in FIG. 23, the UE 100 receives a reference signal from the HeNB 400 and a reference signal from the eNB 200. The UE 100 measures a signal intensity of each reference signal. Further, the UE 100 is connected to the AP 300 (Offloading) and in an idle state (IDLE). That is, the UE 100 is not connected to the eNB 200 and the HeNB 400.

As shown in FIG. 23, in step S901, the UE 100 detects deterioration of the signal intensity of the reference signal from the HeNB 400.

The UE 100 moves in a direction leaving the HeNB 400, and thus, the signal intensity of the reference signal gradually weakens. The UE 100 detects the deterioration of the signal intensity when the signal intensity of the reference signal from the HeNB 400 becomes less than a predetermined value that is a value by which it is possible to ensure the communication quality. As a result, the UE 100 determines on the basis of the deterioration of the signal intensity from the HeNB 400 that the connection with the AP 300 becomes difficult.

It is noted that in the present embodiment, the AP 300 is an AP integrated with the HeNB 400, and thus, when the signal intensity of the reference signal from the HeNB 400 weakens, it is possible to estimate that the UE 100 comes close to the coverage end of the AP 300, as a result of which even when the signal intensity of the beacon signal from the AP 300 is equal to or more than a predetermined value that is a value by which it is possible to ensure the communication quality, the UE 100 determines that the connection with the AP 300 becomes difficult when the signal intensity from the HeNB 400 is less than a predetermined value that is a value by which the connection with the AP 300 becomes difficult.

It is noted that the UE 100 exists in the large cell, and thus, the signal intensity from the eNB 200 is equal to or more than a predetermined value by which it is possible to ensure the communication quality.

In step S902, the UE 100 makes an RRC connection request including a transfer request, to the eNB 200. The eNB 200 receives the RRC connection request.

The transfer request is a request to transfer user data about the UE 100 owned by the AP 300 connected to the UE 100, via the HeNB 400 to the eNB 200.

In step S903, the eNB 200 transmits ACK/NACK that responds to the RRC connection request, to the UE 100. The UE 100 receives the ACK/NACK that responds to the RRC connection request.

In the present embodiment, description proceeds with an assumption that the eNB 200 transmits the ACK (acknowledgment) to the UE 100.

In step S904, Connection Procedure is performed.

In step S905, the UE 100 transmits, to the eNB 200, a Connection complete message indicating that the Connection Procedure is completed. In the present embodiment, in the Connection complete message, information on a transfer cancellation timer is included.

The transfer cancellation timer is used for canceling a process of transferring user data from the AP 300 to the eNB 200. When the transfer cancellation timer expires, the eNB 200 cancels the process of transferring the user data from the AP 300 to the eNB 200.

In step S906, each of the UE 100 and the eNB 200 activates the transfer cancellation timer.

In step S907, the eNB 200 transmits, to the HeNB 400, a message confirming whether or not the HeNB 400 is capable of transferring the user data. Specifically, the eNB 200 performs a Buffer borrowing request to request temporary borrowing of a buffer of the HeNB 400 to transfer the user data. The HeNB 400 receives the Buffer borrowing request.

In step S908, the HeNB 400 transmits ACK/NACK that responds to the Buffer borrowing request, to the eNB 200.

It is noted that the HeNB 400 may transmit the ACK to the eNB 200 even when the UE 100 does not have the access right to the HeNB 400. Further, even when the UE 100 is not a CSG member (that is, the UE 100 does not have the access right to the HeNB 400), the HeNB 400 may determine whether to accept the transfer request of the eNB 200 only when receiving the Buffer borrowing request. Alternatively, the transfer request may be accepted only to the transfer request of the eNB 200 to which the ACK that responds to the Buffer borrowing request is transmitted after receiving the Buffer borrowing request.

Further, the HeNB 400 transmits the NACK (negative acknowledgment) when a buffer capacity is equal to or more than a predetermined value and there is not a sufficient free space. Further, the HeNB 400 may transmit the NACK (negative acknowledgment) when the UE 100 does not have the access right to the HeNB 400.

In the present embodiment, description proceeds with an assumption that the HeNB 400 transmits the ACK (acknowledgment) to the eNB 200. It is noted that a case where the HeNB 400 transmits the NACK (negative acknowledgment) to the eNB 200 will be described later.

In step S909, the eNB 200 makes a transfer request (Forwarding Request) to the HeNB 400. The HeNB 400 receives the transfer request.

In step S910, on the basis of the transfer request from the eNB 200, the HeNB 400 makes a transfer request (Forwarding Request) to transfer the user data of the UE 100 to the AP 300.

It is noted that in the present embodiment, the UE 100 is a CSG member, and thus, it is possible to use a resource of the HeNB 400. Generally, the UE 100 which is not a CSG member is not capable of using the resource of the HeNB 400. However, even for the UE 100 which is not a CSG member, the HeNB 400 may make, on the basis of the transfer request from the eNB 200, a transfer request to transfer the user data of the UE 100 to the AP 300.

In step S911, the AP 300 transfers, to the HeNB 400, the user data of the UE 100 on the basis of the transfer request from the HeNB 400. Here, the AP 300 is directly connected to the HeNB 400 via a specific interface, and thus, the transfer from the AP 300 to the HeNB 400 is rapidly performed.

In step S912, the HeNB 400 transfers, to the eNB 200, the user data transferred from the AP 300. Specifically, the HeNB 400 transfers the user data to the eNB 200 via the X2 interface. As a result, the user data is transferred from the AP 300 by way of the HeNB 400 to the eNB 200.

In step S913, the UE 100 and the eNB 200 use the transferred user data to perform data communication.

When the UE 100 is connected with the AP 300, the connection with the AP 300 may be ended.

Next, a case where the HeNB 400 transmits the NACK (negative acknowledgment) to the eNB 200 will be described by using FIG. 24.

Steps S1001 to S1008 in FIG. 24 correspond to steps S901 to S908 in FIG. 23.

As shown in FIG. 24, in step S1009, the eNB 200 determines whether the NACK is received in response to the Buffer borrowing request. When the ACK is received, the eNB 200 performs a process in step S909 in FIG. 23.

On the other hand, when the NACK is received, in step S1010, in response to the transfer request from the UE 100, the eNB 200 transmits a response (NACK) indicating that the user data is not transferred from the AP 300. The UE 100 receives the response (NACK) of the transfer request.

In step S1011, when receiving the response (NACK) of the transfer request, the UE 100 increments a transfer failure counter (Forwarding trial Counter), by one, provided in the UE 100.

In step S1012, the UE 100 determines whether or not to perform once again step S1002 (that is, whether or not to perform the transfer request in step S902. When the UE 100 determines to perform the transfer request (in a case of Yes), the UE 100 makes once again the transfer request to the eNB 200. For example, when the transfer failure counter does not reach a predetermined value, the UE 100 makes once again the transfer request to the eNB 200. Therefore, the UE 100 repeats the transfer request to the eNB 200 until the transfer failure counter reaches a predetermined value. The eNB 200 that has received the transfer request starts a process in step S1007 (that is, step S907). It is noted that when information on a transfer cancellation timer is included in the transfer request, the eNB 200 starts a process in step S1006 (that is, step S906). When the transfer cancellation timer is being activated, the eNB 200 resets the activated transfer cancellation timer, and activates the transfer cancellation timer on the basis of the information on the transfer cancellation timer.

On the other hand, when the transfer failure counter reaches a predetermined value, the UE 100 determines to not make the transfer request. In this case, the UE 100 performs a process as usual. For example, the UE 100 may transmit the RRC connection request to the eNB 200 or/and the HeNB 400 by reselection. In this case, the UE 100 may transmit the RRC connection request while being connected to the AP 300.

Summary of Sixth Embodiment

In the present embodiment, when it is determined that the connection between the UE 100 and the AP 300 directly connected to the HeNB 400 becomes difficult, the UE 100 is connected to the eNB 200, and the AP 300 transfers the user data of the UE 100 by way of the HeNB 400 to the eNB 200. As a result, the AP 300 is capable of transferring the user data to the HeNB 400 via a specific interface, and thus, the eNB 200 is capable of rapidly acquiring the user data of the UE 100 owned by the AP 300. This restrains stoppage of a user data flow, resulting in a seamless data communication.

In the present embodiment, when determining that the connection with the AP 300 becomes difficult and that it is possible to connect with a large cell, the UE 100 makes the RRC connection request and the transfer request for transferring the user data owned by the AP 300 to the eNB 200, to the eNB 200. Further, the AP 300 transfers the user data to the eNB 200, resulting from the transfer request from the UE 100. Thus, the UE 100, which determines by itself that the connection with the AP 300 becomes difficult, is capable of making an appropriate determination on the basis of an actual radio situation of the UE 100, resulting in a seamless data communication.

In the present embodiment, when the UE 100 is of collocated type in which the AP 300 is located at the same place as the HeNB 400, even when the signal intensity of the beacon signal from the AP 300 is equal to or more than a predetermined value that is a value by which it is possible to ensure the communication quality, if the signal intensity from the HeNB 400 is less than a predetermined value that is a value by which it is possible to ensure the communication quality, then it may be possible to determine that the connection with the AP 300 becomes difficult. Thus, the AP 300 is of collocated type, and therefore, when the signal intensity from the HeNB 400 is less than a predetermined value, it is possible to estimate that the UE 100 exists near the coverage of the AP 300, and as a result, when the transfer request is made in advance, a seamless data communication is further enabled.

In the present embodiment, the eNB 200 transmits the transfer request to the HeNB 400 when receiving the transfer request from the UE 100, the HeNB 400 transmits the transfer request to the AP 300 when receiving the transfer request from the eNB 200, and the AP 300 transfers the user data by way of the HeNB 400 to the eNB 200 when receiving the transfer request from the HeNB 400. Thus, the HeNB 400 and the AP 300 are directly connected, and therefore, the eNB 200 is capable of more rapidly making the transfer request than making the transfer request by way of the core network, to the AP 300. As a result, it is possible to further enable a seamless data communication.

In the present embodiment, even when the UE 100 is not a CSG member, the HeNB 400 transfers the user data transferred from the AP 300, to the eNB 200. As a result, even when the UE 100 is not a CSG member, the eNB 200 is capable of rapidly acquiring the user data of the UE 100 owned by the AP 300, and thus, it is possible to further enable a seamless data communication.

In the present embodiment, when receiving the NACK from the eNB 200 that responds to the transfer request from the UE 100, the UE 100 makes the transfer request once again. As a consequence, even if the transfer request is not accepted first, when a buffer capacity of the HeNB 400 is reduced as a result of the transfer request being made once again by making the transfer request once again, the transfer request is accepted, and thus, a seamless data communication is enabled.

In the present embodiment, the UE 100 repeatedly makes the transfer request until the number of times that NACK is received reaches a predetermined value. Thus, the UE 100 is capable of performing a seamless data communication when the transfer request is accepted as a result of the transfer request being repeated. On the other hand, when the transfer request is not accepted even when the transfer request is sent a predetermined number of times, the UE 100 is capable of restraining a meaningless transfer request transmission by canceling the transfer request.

Seventh Embodiment

Operation According to Seventh Embodiment

Figure 25:
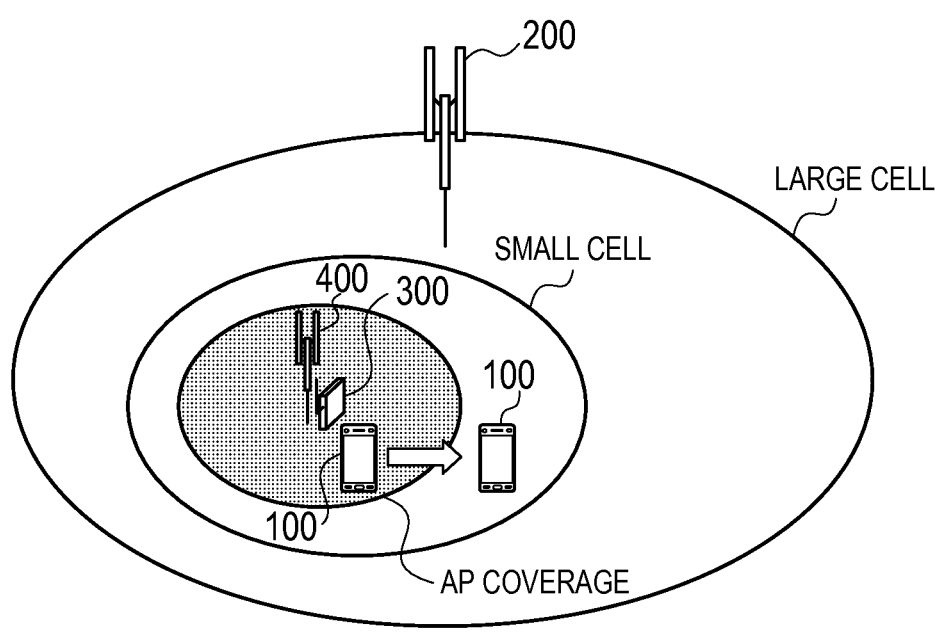
FIG. 25 is a diagram showing a positional relation among the UE 100, the eNB 200, the HeNB 400, and the AP 300 according to the seventh embodiment.
Figure 26:
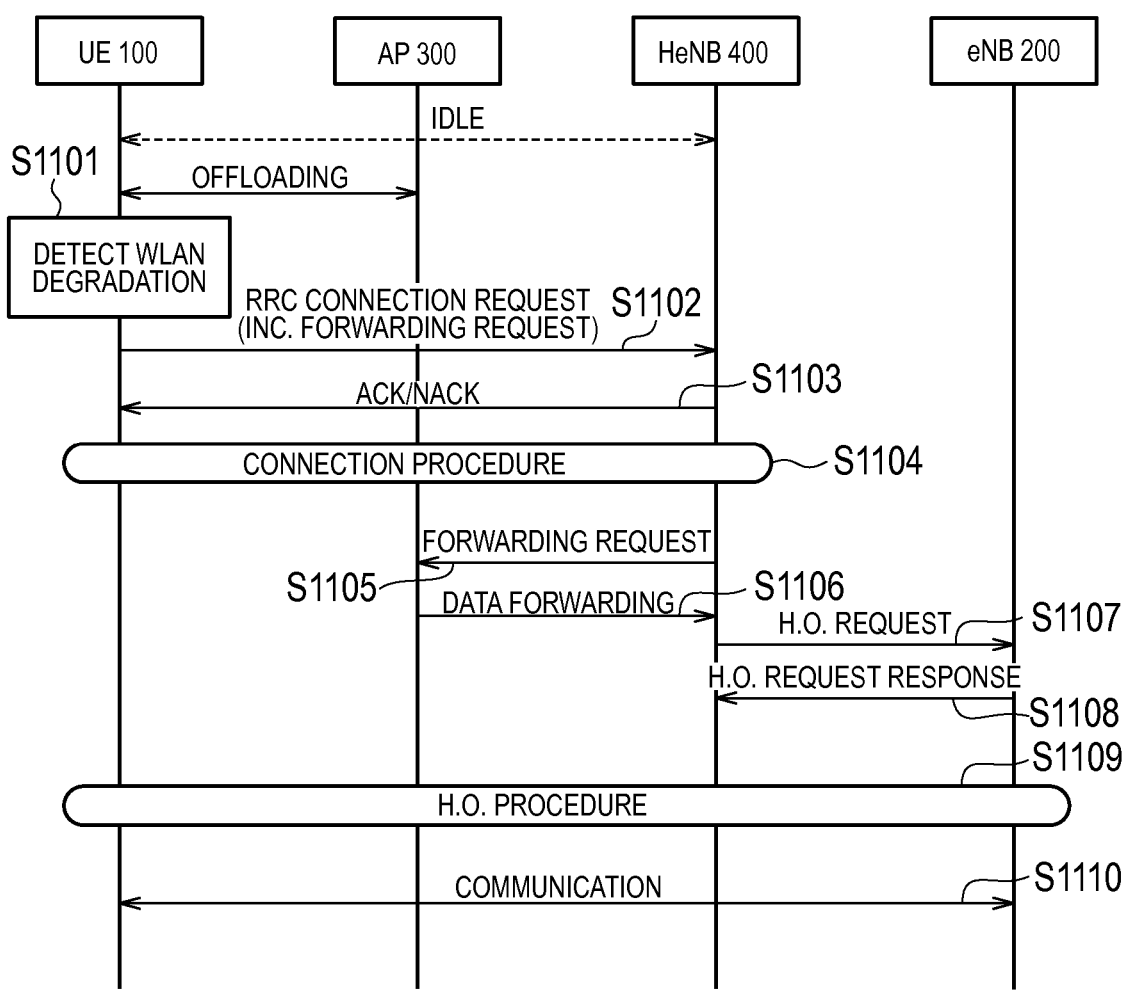
FIG. 26 is a sequence diagram for describing an operation according to the seventh embodiment.

Next, an operation according to a seventh embodiment will be described by using FIG. 25 and FIG. 26. FIG. 25 is a diagram showing a positional relation among the UE 100, the eNB 200, the HeNB 400, and the AP 300 according to the seventh embodiment. FIG. 26 is a sequence diagram for describing an operation according to the seventh embodiment. It is noted that a description will be provided while focusing on a portion different from the above-described embodiment, and a description of a similar portion will be omitted.

It is noted that in the seventh embodiment, in much the same way as in the sixth embodiment, the UE 100 recognizes that the UE 100 is being connected to the AP 300 and the connected AP 300 is an AP 300 integrated with the HeNB 400.

In the above-described sixth embodiment, the coverage of the AP 300 is larger than the coverage of the small cell. In the present embodiment, the coverage of the AP 300 and the coverage of the small cell are the same, or as shown in FIG. 25, the coverage of the small cell is larger than the coverage of the AP 300.

As shown in FIG. 26, in step S1101, the UE 100 detects deterioration of the signal intensity of the beacon signal from the AP 300.

The UE 100 moves in a direction leaving the HeNB 400, and thus, the signal intensity of the beacon signal gradually weakens. The UE 100 detects the deterioration of the signal intensity when the signal intensity of the beacon signal from the AP 300 becomes less than a predetermined value. As a result, the UE 100 determines on the basis of the deterioration of the signal intensity from the AP 300 that the connection with the AP 300 becomes difficult. In the present embodiment, the UE 100 determines that the connection with the AP 300 becomes difficult when the signal intensity of the beacon signal from the AP 300 becomes less than a predetermined value before the signal intensity received from the HeNB 400 becomes less than a predetermined value that is a value by which it is possible to ensure the communication quality.

It is noted that the UE 100 exists in the small cell, and thus, the signal intensity from the HeNB 400 is equal to or more than a predetermined value.

In step S1102, the UE 100 makes an RRC connection request including a transfer request, to the HeNB 400. The HeNB 400 receives the RRC connection request.

When the signal intensity of the reference signal from the HeNB 400 is equal to or more than a predetermined value, the UE 100 makes the connection request to the HeNB 400.

It is noted that when the signal intensity of the reference signal from the HeNB 400 is less than a predetermined value, the UE 100 makes the connection request to the eNB 200.

In step S1103, the HeNB 400 transmits ACK/NACK that responds to the RRC connection request, to the UE 100. The UE 100 receives the ACK/NACK that responds to the RRC connection request.

In the present embodiment, description proceeds with an assumption that the HeNB 400 transmits the ACK (acknowledgment) to the UE 100.

In step S1104, Connection Procedure is performed.

In step S1105, the HeNB 400 transmits, to the AP 300, the transfer request to transfer the user data from the AP 300 to the HeNB 400, on the basis of the transfer request from the UE 100. The AP 300 receives the transfer request.

In step S1106, the AP 300 transfers the user data to the HeNB 400.

In step S1107, the HeNB 400 transmits a handover request (H.O. Request Ack) to the eNB 200 when the user data is transferred. The eNB 200 receives the handover request.

When receiving the measurement report indicating that the signal intensity from the HeNB 400 received by the UE 100 is less than a predetermined value, the HeNB 400 may transmit the handover request to the eNB 200.

Further, when the UE 100 is not a CSG member, the HeNB 400 is not capable of using the resource (a resources for control signals and a buffer of the HeNB 400) of the HeNB 400, for the UE which is not a CSG member. However, when the UE 100 is not a CSG member, the HeNB 400 may permit the UE 100 to use the resources of the HeNB 400 on condition that the handover request is immediately transmitted to the eNB 200 when the user data is transferred to the HeNB 400 and when the CSG cell of the HeNB 400 and the UE 100 are connected.

In step S1108, a handover request response (H. O. Request Response) that responds to the handover request is transmitted to the HeNB 400.

In step S1109, a handover procedure (H. O. Procedure) is performed.

In step S1110, the UE 100 and the eNB 200 use the transferred user data to perform data communication.

Summary of Seventh Embodiment

In the present embodiment, when determining that the connection with the AP 300 becomes difficult and that it is possible to connect with a small cell, the UE 100 makes to the HeNB 400 the RRC connection request and the transfer request for transferring the user data owned by the AP 300 to the HeNB 400. Further, the AP 300 transfers the user data to the HeNB 400, on the basis of the transfer request from the UE 100. As a result, the HeNB 400 is capable of rapidly acquiring the user data of the UE 100 owned by the AP 300, and thus, it is possible to restrain a flow of the user data from stopping and possible to further enable a seamless data communication.

In the present embodiment, the UE 100 determines that the connection with the AP 300 becomes difficult when the signal intensity of the beacon signal from the AP 300 becomes less than a predetermined value before the signal intensity received from the HeNB 400 becomes less than a predetermined value that is a value by which it is possible to ensure the communication quality. As a result, the UE 100 is capable of appropriately selecting the HeNB 400 as a target to which the transfer request is sent.

In the present embodiment, when the UE 100 is not a CSG member, the HeNB 400 may immediately transmit the handover request to the eNB 200 when the user data is transferred and when the CSG cell of the HeNB 400 and the UE 100 are connected. As a result, even the UE 100 which is not a CSG member is capable of a seamless data communication by using the HeNB 400.

Other Embodiments

In the operation sequences according to the above-described first and second embodiments, the operation performed by the eNB 200 (base station) may be performed by another network device such as an upper device (for example, RNC) of the eNB 200 instead of the eNB 200.

In the above-described third embodiment and fourth embodiments, no consideration is given to the operation environment where a movable AP (such as a mobile router) exists in the transport T. However, it is possible to apply the present invention to such an operation environment. For example, when being connected to the AP (movable AP) by the WLAN communication unit 112 and detecting that the UE movement speed rapidly decreases, the processor 160 of the UE 100 may restrict a start of connection with another AP (AP 300) while maintaining the connection with that AP (movable AP).

In the modification of the third embodiment and the modification of the fourth embodiment, an example is described where the AP blacklist is provided from the eNB 200. However, the UE 100 may previously hold the AP blacklist.

In the above-described fifth embodiment, the information transmitted and received between the UE 100 and the eNB 200 may be an RRC message or information element thereof.

In the above-described fifth embodiment, a case is assumed where the eNB 200 is a macro cell base station having a broad coverage; however, the eNB 200 may be a small cell base station having a coverage comparable to that of the AP 300. Further, when the eNB 200 is a small cell base station and the AP 300 is collocated with the eNB 200, it may be possible to omit the determination (step S805) whether or not the UE 100 comes close to the AP 300.

The second modification of the above-described fifth embodiment may be applied to a process closed by the UE 100. Specifically, when it is possible to estimate on the basis of the reception level of the GNSS signal that the UE 100 is located outdoors, the UE 100 regards the WLAN frequency band prohibited to be used outdoors not subject to the WLAN scan.

In the above-described sixth and seventh embodiments, the UE 100 determines whether or not the connection between the UE 100 and the AP 300 becomes difficult; however this is not limiting. The AP 300 may determine whether or not the connection between the UE 100 and the AP 300 becomes difficult.

Specifically, when the AP 300 measures the signal intensity received from the UE 100 and the signal intensity received from the UE 100 is less than a predetermined value that is a value by which it is possible to ensure the communication quality, the AP 300 determines that the connection between the UE 100 and the AP 300 becomes difficult.

When the AP 300 determines that the connection between the UE 100 and the AP 300 becomes difficult, the user data is transferred based on (A) the initiative of the UE or (B) the initiative of the AP 300, as shown below.

(A) The Initiative of the UE 100

When determining that the connection between the UE 100 and the AP 300 becomes difficult, the AP 300 notifies the UE 100 that the connection between the UE 100 and the AP 300 becomes difficult. When receiving the notification, the UE 100 measures the signal intensity of each reference signal of the eNB 200 and the HeNB 400.

The UE 100 makes the RRC connection request including the transfer request to the eNB 200 or the HeNB 400 having a signal intensity being equal to or more than a predetermined value, out of the reference signals of the eNB 200 and the HeNB 400. The processes after this are performed in much the same way as in the sixth or seventh embodiment.

When such a process is performed, the UE 100 does not need to perform a determination process that the connection between the UE 100 and the AP 300 becomes difficult, and thus, it is possible to restrain a process load in the UE 100.

(B) The Initiative of the AP 300

When the AP 300 determines that the connection between the UE 100 and the AP 300 becomes difficult, the AP 300 makes a request the eNB 200 or the HeNB 400 adjacent to the AP 300 so that the eNB 200 or the HeNB 400 adjacent to the AP 300 is connected to the UE 100. When making the connection request to the eNB 200, the AP 300 requests the eNB 200 by way of the HeNB 400. Description proceeds with an assumption that the AP 300 requests the HeNB 400 to be connected to the UE 100, below.

When receiving the connection request from the AP 300, the HeNB 400 transmits, by paging, for example, to the UE 100 a notification indicating that the HeNB 400 is connected to the UE 100. The UE 100 is connected to the HeNB 400 on the basis of the notification.

When the connection with the UE 100 is completed, the HeNB 400 transmits a connection complete notification to the AP 300. When receiving the connection complete notification, the AP 300 starts transferring the user data to the HeNB 400.

It is noted that when making the connection request to the eNB 200, the AP 300 receives the connection complete notification from the eNB 200 to the AP 300 by way of the HeNB 400.

When such a process is performed, it is possible to restrain a process load of the UE 100 because the UE 100 does not need to transmit the transfer request.

It is noted that when the connection with the eNB 200 or the HeNB 400 is completed, the UE 100 may perform a process for ending the connection between the UE 100 and the AP 300.

Further, in the above-described sixth and seventh embodiments, when determining that the connection with the AP 300 becomes difficult, the UE 100 is connected to the HeNB 400 directly connected to the AP 300 with which the UE 100 is connected or the eNB 200 that manages the large cell enveloping the coverage of the AP; this is not limiting. For example, the UE 100 may be connected to the HeNB 400 adjacent to the HeNB 400 directly connected to the AP 300 with which the UE 100 is connected. In this case, the HeNB 400 directly connected to the AP 300 with which the UE 100 is connected transfers the user data to the adjacent HeNB 400 via the X2 interface.

Further, in the above-described sixth and seventh embodiments, the coverage of the small cell and the coverage of the AP 300 are enveloped in the coverage of the large cell; however, this is not limiting. The coverage of the small cell and the coverage of the AP 300 may partially overlap the coverage of the large cell.

Further, in the above-described sixth and seventh embodiments, as the small cell base station, the HeNB 400 is described as an example; however, this is not limiting. For example, a small cell base station may be a femto cell or a pico cell that manages the small cell.

Further, in the above-described sixth embodiment, the eNB 200 makes the Buffer borrowing request; however, this is not limiting. The eNB 200 may make the transfer request to the HeNB 400 without making the Buffer borrowing request.

It is noted that when the reference signal from the HeNB 400 and the beacon signal from the AP 300 are less than a predetermined value at the same time, or when the beacon signal from the AP 300 is less than a predetermined value before a predetermined time passes since the reference signal from the HeNB 400 is less than a predetermined value, the UE 100 may make the RRC connection request including the transfer request to the eNB 200.

It is noted that in the above-described sixth and seventh embodiments, the UE 100 is in an idle state; however, when the UE 100 is in a state of being connected to the HeNB 400, the UE 100 implements a normal handover to the eNB 200.

In addition, in each above-described embodiment, the LTE system is described as one example of the cellular communication system; however, this is not limited to the LTE system, and the present invention may be applied to a cellular communication system other than the LTE system.

In addition, the entire content of Japanese Patent Application No. 2013-100600 (filed on May 10, 2013), Japanese Patent Application No. 2013-100777 (filed on May 10, 2013), Japanese Patent Application No. 2013-100779 (filed on May 10, 2013), Japanese Patent Application No. 2013-100780 (filed on May 10, 2013), and U.S. Provisional Application No. 61/864,250 (filed on Aug. 9, 2013) is incorporated in the present specification by reference.

INDUSTRIAL APPLICABILITY

As described above, the communication control method and the user terminal according to the present invention is useful for a mobile communication field.

The invention claimed is:

1. A communication control method for performing offload to transfer a traffic of an Evolved Universal Terrestrial Radio Access Network (E-UTRAN) to a Wireless Local Area Network (WLAN), comprising:
receiving, by a user terminal, from the E-UTRAN, before releasing a connection between the E-UTRAN and the user terminal, first information that is for configuration of an operation of the user terminal after releasing the connection;
starting, by the user terminal, the offload;
determining, by the user terminal, whether the offload is canceled after the offload is started, based at least on a communication status between the user terminal and the WLAN;
starting use of the first information by the user terminal after releasing the connection and a transition to an idle state; and
canceling the offload and discarding the first information, by the user terminal, in response to determining that the offload is canceled.

2. The communication control method according to claim 1, wherein in the determining, the user terminal determines whether the offload is canceled after the offload is started, on the basis of a communication status with the WLAN.

3. A user terminal comprising:
a processor and a memory communicatively coupled to the processor, the processor is configured to execute processes of:
receiving, from an Evolved Universal Terrestrial Radio Access Network (E-UTRAN), before releasing a connection between the E-UTRAN and the user terminal, first information that is for configuration of an operation of the user terminal after releasing the connection;
starting an offload to transfer a traffic of the E-UTRAN to a Wireless Local Area Network (WLAN);
determining whether the offload is canceled after the offload is started, based at least on a communication status between the user terminal and the WLAN;
starting use of the first information by the user terminal after releasing the connection and a transition to an idle state; and
canceling the offload and discarding the first information, by the user terminal, in response to determining that the offload is canceled.

4. An apparatus for controlling a user terminal, the apparatus comprising:
a processor and a memory communicatively coupled to the processor, the processor is configured to execute processes of:
receiving, from an Evolved Universal Terrestrial Radio Access Network (E-UTRAN), before releasing a connection between the E-UTRAN and the user terminal, first information that is for configuration of an operation of the user terminal after releasing the connection;
starting an offload to transfer a traffic of the E-UTRAN to a Wireless Local Area Network (WLAN);
determining whether the offload is canceled after the offload is started, based at least on a communication status between the user terminal and the WLAN;

starting use of the first information by the user terminal after releasing the connection and a transition to an idle state; and canceling the offload and discarding the first information, by the user terminal, in response to determining that the offload is canceled.

5. The communication control method according to claim 1, wherein the receiving first information comprises receiving, by the user terminal, from the E-UTRAN, before releasing the connection between the E-UTRAN and the user terminal, second information that is for determining start of the offload, and the starting the offload comprises starting, by the user terminal, the offload based on the second information.

6. The user terminal according to claim 3, wherein the controller is configure to:

receive, from the E-UTRAN, before releasing the connection between the E-UTRAN and the user terminal, second information that is for determining start of the offload; and starting the offload based on the second information.

7. The processor according to claim 4, wherein the memory includes instructions, such that when executed by the processor performs the processes of:

receiving, from the E-UTRAN, before releasing the connection between the E-UTRAN and the user terminal, second information that is for determining start of the offload; and starting the offload based on the second information.

* * * * *